United States Patent
Inoue et al.

(10) Patent No.: US 12,211,377 B2
(45) Date of Patent: Jan. 28, 2025

(54) INFORMATION CONTROL SYSTEM AND VEHICLE HAVING MOBILE COMMUNICATION DEVICE

(71) Applicant: NIKON CORPORATION, Tokyo (JP)

(72) Inventors: Hideya Inoue, Tokyo (JP); Koji Yamagaki, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 17/225,990

(22) Filed: Apr. 8, 2021

(65) Prior Publication Data

US 2021/0225166 A1 Jul. 22, 2021

Related U.S. Application Data

(62) Division of application No. 15/907,219, filed on Feb. 27, 2018, now Pat. No. 10,977,938, which is a division of application No. 14/820,495, filed on Aug. 6, 2015, now abandoned, which is a division of application No. 13/198,676, filed on Aug. 4, 2011, now abandoned.

(Continued)

(30) Foreign Application Priority Data

Aug. 6, 2010 (JP) .................. 2010-177724
Aug. 6, 2010 (JP) .................. 2010-177725

(51) Int. Cl.
*G08G 1/07* (2006.01)
*G08G 1/04* (2006.01)
*G08G 1/08* (2006.01)
*H04N 7/18* (2006.01)

(52) U.S. Cl.
CPC ............ *G08G 1/07* (2013.01); *G08G 1/04* (2013.01); *G08G 1/08* (2013.01); *H04N 7/181* (2013.01); *H04N 7/188* (2013.01)

(58) Field of Classification Search
CPC ......................................... G08G 1/164
USPC ..................................... 348/207.99
See application file for complete search history.

(56) References Cited

U.S. PATENT DOCUMENTS 5,434,927 A 7/1995 Brady et al.
5,734,337 A 3/1998 Kupersmit
(Continued)

FOREIGN PATENT DOCUMENTS

CN 1301648 7/2001
CN 1776768 5/2006
(Continued)

OTHER PUBLICATIONS

Japanese Office Action for corresponding JP Application No. 2020-112595, Jun. 1, 2021.
(Continued)

*Primary Examiner* — Anthony J Daniels
(74) *Attorney, Agent, or Firm* — MORI & WARD, LLP

(57) ABSTRACT

A vehicle includes a mobile communication device, where the mobile communication device is connected to a driving unit of the vehicle and controls a traveling speed of the vehicle, which is traveling toward an intersection, in order to avoid a collision of the vehicle at the intersection by receiving analysis result information, which is based on image information from an imaging apparatus provided near the intersection, from an information control device.

9 Claims, 13 Drawing Sheets

Related U.S. Application Data

(60) Provisional application No. 61/508,536, filed on Jul. 15, 2011, provisional application No. 61/508,026, filed on Jul. 14, 2011.

(56) References Cited

U.S. PATENT DOCUMENTS

| | | | |
|---|---|---|---|
| 5,774,569 A | 6/1998 | Waldenmaier | |
| 5,939,976 A * | 8/1999 | Sasaki | B60Q 9/008 340/436 |
| 6,307,484 B1 * | 10/2001 | Sasaki | G08G 1/164 340/436 |
| 6,392,563 B1 | 5/2002 | Paquette et al. | |
| 6,466,260 B1 * | 10/2002 | Hatae | H04N 7/181 348/E7.086 |
| 6,989,766 B2 | 1/2006 | Mese et al. | |
| 7,333,012 B1 * | 2/2008 | Nguyen | B60R 25/04 701/99 |
| 7,423,551 B1 | 9/2008 | Sharrow | |
| 8,135,177 B2 * | 3/2012 | Benten | G08G 1/017 348/154 |
| 8,175,796 B1 * | 5/2012 | Blackburn | G08G 1/161 340/902 |
| 2002/0082806 A1 | 6/2002 | Kaub | |
| 2002/0116118 A1 | 8/2002 | Stallard et al. | |
| 2003/0016143 A1 * | 1/2003 | Ghazarian | G08G 1/0962 340/901 |
| 2005/0111701 A1 | 5/2005 | Seki et al. | |
| 2005/0169500 A1 | 8/2005 | Takahashi et al. | |
| 2005/0218834 A1 | 10/2005 | Chen | |
| 2005/0267651 A1 | 12/2005 | Arango et al. | |
| 2006/0095199 A1 | 5/2006 | Lagassey | |
| 2006/0181433 A1 * | 8/2006 | Wolterman | G08G 1/164 340/905 |
| 2007/0273552 A1 | 11/2007 | Tischer | |
| 2007/0276600 A1 * | 11/2007 | King | G08G 1/0962 340/436 |
| 2008/0015772 A1 | 1/2008 | Sanma et al. | |
| 2008/0133136 A1 * | 6/2008 | Breed | G05D 1/0274 340/901 |
| 2009/0028389 A1 | 1/2009 | Edanami | |
| 2009/0140881 A1 | 6/2009 | Sakai et al. | |
| 2009/0322559 A1 | 12/2009 | Yen et al. | |
| 2010/0271484 A1 * | 10/2010 | Fishwick | H04N 5/145 348/169 |
| 2014/0025239 A1 | 1/2014 | Breslau et al. | |

FOREIGN PATENT DOCUMENTS

| | | | |
|---|---|---|---|
| CN | 101140704 | 3/2008 | |
| CN | 101232335 | 7/2008 | |
| CN | 101388145 | 3/2009 | |
| CN | 101409016 | 4/2009 | |
| EP | 0680028 | 11/1995 | |
| JP | 05-334597 | 12/1993 | |
| JP | 06-035896 | 2/1994 | |
| JP | 07-141589 | 6/1995 | |
| JP | 07-296290 | 11/1995 | |
| JP | 09-054894 | 2/1997 | |
| JP | 10-097696 | 4/1998 | |
| JP | 11-203589 | 7/1999 | |
| JP | 11-203590 | 7/1999 | |
| JP | 11-261990 | 9/1999 | |
| JP | 2000-127796 | 5/2000 | |
| JP | 2000-172987 | 6/2000 | |
| JP | 2000-207676 | 7/2000 | |
| JP | 2001-067587 | 3/2001 | |
| JP | 2001-155289 | 6/2001 | |
| JP | 2001-155292 | 6/2001 | |
| JP | 2001-229487 | 8/2001 | |
| JP | 2001-291184 | 10/2001 | |
| JP | 2002-073940 | 3/2002 | |
| JP | 2002-092797 | 3/2002 | |
| JP | 2002-140799 | 5/2002 | |
| JP | 2002-245586 | 8/2002 | |
| JP | 2003-022493 | 1/2003 | |
| JP | 2003-030703 | 1/2003 | |
| JP | 2003-296710 | 10/2003 | |
| JP | 2004-021514 | 1/2004 | |
| JP | 2004-185399 | 7/2004 | |
| JP | 2004-348469 | 12/2004 | |
| JP | 2004-355293 | 12/2004 | |
| JP | 2005-159691 | 6/2005 | |
| JP | 2005-216070 | 8/2005 | |
| JP | 2006-113682 | 4/2006 | |
| JP | 2006-155209 | 6/2006 | |
| JP | 2006-224754 | 8/2006 | |
| JP | 2006-331002 | 12/2006 | |
| JP | 2007-042042 | 2/2007 | |
| JP | 2007-047894 | 2/2007 | |
| JP | 2007-148849 | 6/2007 | |
| JP | 2007-280425 | 10/2007 | |
| JP | 2007-316827 | 12/2007 | |
| JP | 2008-071176 | 3/2008 | |
| JP | 2008-097212 | 4/2008 | |
| JP | 2008-217813 | 9/2008 | |
| JP | 2008-305245 | 12/2008 | |
| JP | 2009-070243 | 4/2009 | |
| JP | 2009-104531 | 5/2009 | |
| JP | 2009110205 A * | 5/2009 | B60R 21/013 |
| JP | 2009-129006 | 6/2009 | |
| JP | 2009-176235 | 8/2009 | |
| JP | 2009-199532 | 9/2009 | |
| JP | 2010-003242 | 1/2010 | |

OTHER PUBLICATIONS

Indian Office Action for corresponding IN Application No. 202018033592, Jul. 9, 2021.

Form PCT/ISA/206 Invitation to pay additional fees and, where applicable, protest fee w/ Annex for corresponding International Application No. PCT/JP2011/067940, Sep. 6, 2011.

International Search Report for corresponding International Application No. PCT/JP2011/067940, Nov. 8, 2011.

Written Opinion of the International Searching Authority for International Application No. PCT/JP2011/067940, Nov. 8, 2011.

Japanese Office Action for corresponding JP Application No. 2010-177724, Apr. 15, 2014.

Japanese Office Action for corresponding JP Application No. 2010-177725, Apr. 15, 2014.

Chinese Office Action for corresponding CN Application No. 201180038772.9, Aug. 11, 2014.

Japanese Office Action for corresponding JP Application No. 2010-177725, Mar. 3, 2015.

Chinese Office Action for corresponding CN Application No. 201510902551.1, May 12, 2017.

Japanese Office Action for corresponding JP Application No. 2015-074921, Feb. 2, 2016.

Japanese Office Action for corresponding JP Application No. 2015-113272, Feb. 7, 2017.

Japanese Office Action for corresponding JP Application No. 2015-113272, Apr. 5, 2016.

Office Action with Form PTO-892 Notice of References Cited issued by the U.S. Patent and Trademark Office for the U.S. Appl. No. 13/198,676, filed Mar. 11, 2014.

Office Action with Form PTO-892 Notice of References Cited issued by the U.S. Patent and Trademark Office for the U.S. Appl. No. 13/198,676, filed Jul. 11, 2014.

Office Action with Form PTO-892 Notice of References Cited issued by the U.S. Patent and Trademark Office for the U.S. Appl. No. 13/198,676, filed Dec. 2, 2014.

Office Action issued by the U.S. Patent and Trademark Office for the U.S. Appl. No. 13/198,676, filed May 6, 2015.

Office Action with Form PTO-892 Notice of References Cited issued by the U.S. Patent and Trademark Office for the U.S. Appl. No. 14/820,495, filed Oct. 6, 2016.

Office Action with Form PTO-892 Notice of References Cited issued by the U.S. Patent and Trademark Office for the U.S. Appl. No. 14/820,495, filed Mar. 14, 2017.

(56) References Cited

OTHER PUBLICATIONS

Office Action with Form PTO-892 Notice of References Cited issued by the U.S. Patent and Trademark Office for the U.S. Appl. No. 14/820,495, filed Sep. 28, 2017.
Indian Office Action for corresponding IN Application No. 604/DELNP/2013, Feb. 14, 2018.
Chinese Office Action for corresponding CN Application No. 201510902551.1, Jun. 20, 2018.
Japanese Office Action for corresponding JP Application No. 2017-045194, Feb. 6, 2018.
Chinese Office Action for corresponding CN Application No. 201610221940.2, Jul. 10, 2018.
Japanese Office Action for corresponding JP Application No. 2017-045194, Sep. 4, 2018.
Chinese Office Action for corresponding CN Application No. 201610221940.2, Dec. 19, 2018.
Japanese Office Action for corresponding JP Application No. 2017-045194, Apr. 2, 2019 (w/ machine translation).
Japanese Office Action for corresponding JP Application No. 2018-243161, Feb. 18, 2020.
Trial and Appeal Decision for corresponding JP Application No. 2017-045194, Jul. 7, 2020 (w/ machine translation).
Requirement for Restriction/Election issued by the U.S. Patent and Trademark Office for the parent U.S. Appl. No. 15/907,219, filed Sep. 6, 2019.
Office Action with Form PTO-892 Notice of References Cited issued by the United States Patent and Trademark Office for the parent U.S. Appl. No. 15/907,219, filed Nov. 25, 2019.
Office Action issued by the United States Patent and Trademark Office for the parent U.S. Appl. No. 15/907,219, filed Apr. 2, 2020.
Advisory Action issued by the U.S. Patent and Trademark Office for the parent U.S. Appl. No. 15/907,219, filed Jul. 23, 2020.
Office Action with Form PTO-892 Notice of References Cited issued by the United States Patent and Trademark Office for the parent U.S. Appl. No. 15/907,219, filed Aug. 21, 2020.
Notice of Allowance with Form PTO-892 Notice of References Cited issued by the U.S. Patent and Trademark Office for the parent U.S. Appl. No. 15/907,219, filed Dec. 10, 2020.
Advisory Action issued by the U.S. Patent and Trademark Office for the U.S. Appl. No. 13/198,676, filed Oct. 22, 2014.
Advisory Action issued by the U.S. Patent and Trademark Office for the U.S. Appl. No. 14/820,495, filed Aug. 24, 2017.
Japanese Office Action for corresponding JP Application No. 2020-112595, Feb. 22, 2022 (w/ machine translation).
Japanese Office Action for corresponding JP Application No. 2020-112595, Aug. 23, 2022 (w/ machine translation).
Japanese Office Action for corresponding JP Application No. 2020-112595, Mar. 7, 2023 (w/ machine translation).
Japanese Office Action for corresponding JP Application No. 2022-065582, Feb. 14, 2023 (w/ machine translation).
Japanese Office Action for corresponding JP Application No. 2022-065582, Aug. 8, 2023 (w/ machine translation).
Japanese Office Action for corresponding JP Application No. 2022-065582, Dec. 19, 2023 (w/ machine translation).
Japanese Office Action for corresponding JP Application No. 2024-059751, Dec. 12, 2024 (w/ English machine translation).

* cited by examiner

FIG. 3

SIGNAL SURROUNDING INFORMATION TABLE

| IMAGE ID | DATE AND TIME | NUMBER OF VEHICLES | NUMBER OF PERSONS | VEHICLE ATTRIBUTE INFORMATION | PERSON ATTRIBUTE INFORMATION | WEATHER | TEMPERATURE | NOISE LEVEL | SIGNAL LIGHTING COLOR |
|---|---|---|---|---|---|---|---|---|---|
| 0001 | 10/07/01 10:00 | 5 | 3 | C1, C2, C3, C4, C5 | H1, H2 | SUNNY | 21.0°C | 3 | GREEN (BLUE) |
| 0002 | 10/07/01 10:05 | 15 | 5 | C6, ..., C20 | H3, H4, H5, H6, H7 | SUNNY | 21.5°C | 5 | RED |
| 0003 | 10/07/01 10:10 | 3 | 3 | C21, C22, C23 | H8, H9, H10 | SUNNY | 22°C | 2 | GREEN (BLUE) |
| 0004 | 10/07/01 10:15 | 5 | 5 | ... | ... | CLOUDY | 22°C | 3 | YELLOW |
| 0005 | 10/07/01 10:20 | 9 | 7 | ... | ... | CLOUDY | 22°C | 4 | RED |

FIG. 4

VEHICLE ATTRIBUTE INFORMATION TABLE

| VEHICLE ID | LICENSE PLATE NUMBER | VEHICLE TYPE | VEHICLE BODY COLOR | NUMBER OF OCCUPANTS | DRIVER'S SEX | DRIVER'S AGE | TRAVELING SPEED |
|---|---|---|---|---|---|---|---|
| C1 | XXXX | ... | ... | ... | ... | ... | ... |
| C2 | XXXX | ... | ... | ... | ... | ... | ... |
| C3 | XXXX | ... | ... | ... | ... | ... | ... |
| C4 | XXXX | ... | ... | ... | ... | ... | ... |
| C5 | XXXX | | | | | | |

FIG. 5

PERSON ATTRIBUTION INFORMATION TABLE

| PERSON ID | SEX | AGE | HEIGHT | CLOTHING | MOVING METHOD | BELONGINGS | WALKING SPEED |
|---|---|---|---|---|---|---|---|
| H1 | ... | ... | ... | ... | ... | ... | ... |
| H2 | ... | ... | ... | ... | ... | ... | ... |
| H3 | ... | ... | ... | ... | ... | ... | ... |
| H4 | ... | ... | ... | ... | ... | ... | ... |
| H5 | ... | ... | ... | ... | ... | ... | ... |

INFORMATION CONTROL SYSTEM AND VEHICLE HAVING MOBILE COMMUNICATION DEVICE

CROSS-REFERENCE TO RELATED APPLICATION

This application is a divisional application of U.S. non-provisional application Ser. No. 15/907,219, filed on Feb. 27, 2018 which is a divisional application of U.S. non-provisional application Ser. No. 14/820,495, filed on Aug. 6, 2015 which is a divisional application of U.S. non-provisional application Ser. No. 13/198,676, filed on Aug. 4, 2011. The U.S. non-provisional application Ser. No. 13/198,676 claims priority to and the benefit of U.S. provisional application No. 61/508,026, filed on Jul. 14, 2011 and 61/508,536, filed on Jul. 15, 2011. The U.S. non-provisional application Ser. No. 13/198,676 also claims priority to and the benefit of Japanese Patent Application Nos. 2010-177724, filed on Aug. 6, 2010 and 2010-177725 filed on Aug. 6, 2010. The entire contents of which are incorporated herein by reference.

BACKGROUND

Field of the Invention

The present invention relates to a signal control apparatus and a signal having the same.

Description of Related Art

For example, there is a television camera apparatus for traffic monitoring in which a camera is mounted in a traffic signal and which takes photographs near the intersection and monitors the traffic situation using the photographed image such as described in Japanese Unexamined Patent Application Publication No. 11-261990.

In addition, conventionally, a traffic signal receives a control signal for changing a display state of a signal display unit from a high-order control apparatus and changes the display state of the signal display unit on the basis of the received control signal, for example, such as described in Japanese Unexamined Patent Application Publication No. 10-97696.

SUMMARY

According to an aspect of the present invention, a vehicle includes a mobile communication device, where the mobile communication device is connected to a driving unit of the vehicle and controls a traveling speed of the vehicle, which is traveling toward an intersection, in order to avoid a collision of the vehicle at the intersection by receiving analysis result information, which is based on image information from an imaging apparatus provided near the intersection, from an information control device.

According to a further aspect of the present invention, an information control system includes an imaging apparatus that captures images near an intersection, and an information control apparatus that analyzes traveling states of vehicles that enter the intersection from different directions to each other and that transmits information, which is for avoiding a collision between the vehicles at the intersection, to mobile communication devices mounted on the vehicles, based on image information from the imaging apparatus.

According to a still further aspect of the present invention, an information control system includes a traffic signal including an imaging apparatus, and an analyzing device that analyzes vehicles or people near the traffic signal based on image information from the imaging apparatus and that obtains traffic volume or a number of people in an area where the traffic signal is disposed as analysis result information for each period of time of a day based on information indicating date and time, number of vehicles, and number of people.

According to a still further aspect of the present invention, a vehicle includes a mobile communication device, where the mobile communication device includes a car navigation function and is capable of displaying an image of a situation in a traveling route of the vehicle by receiving image information, which is obtained from an image apparatus provided near an intersection through which the vehicle will travel, from an information control device.

According to a still further aspect of the present invention, an information control system includes a traffic signal including an imaging apparatus, and an analyzing device that analyzes an image of a vehicle captured by the imaging apparatus and that obtains information regarding violation of traffic rules of the vehicle.

BRIEF DESCRIPTION OF THE DRAWINGS

FIG. 3 shows an example of a table of signal surrounding information related to the first embodiment of the present invention.

FIG. 4 shows an example of a table of vehicle attribution information related to the first embodiment of the present invention.

FIG. 5 shows an example of a table of person attribution information related to the first embodiment of the present invention.

DESCRIPTION OF EMBODIMENTS

First Embodiment

Figure 1:
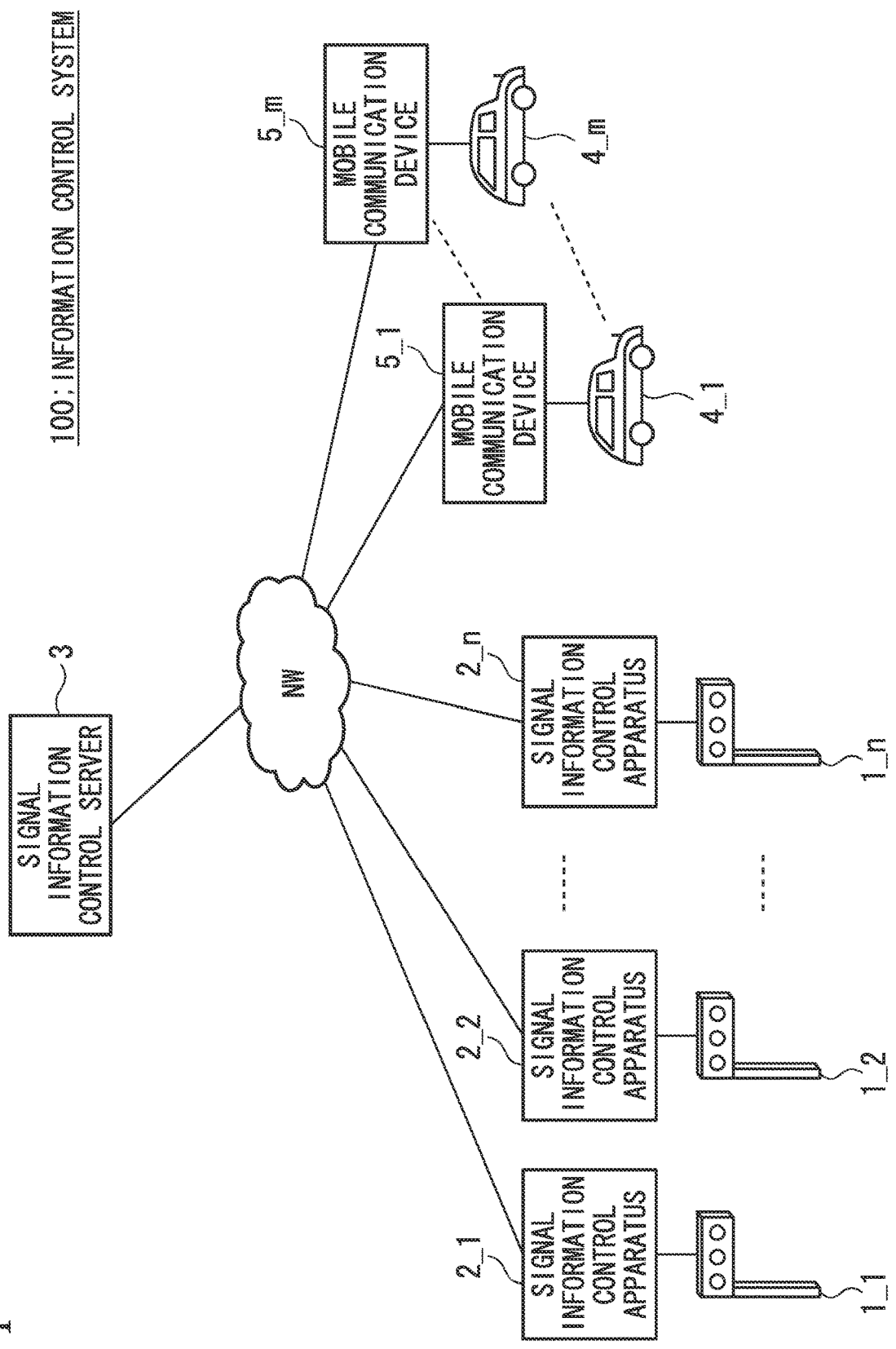
FIG. 1 is a schematic diagram showing the configuration of an information control system related to a first embodiment of the present invention.

A first embodiment of the present invention will be described in detail with reference to the drawings. FIG. 1 shows the configuration of an information control system related to the first embodiment.

As shown in FIG. 1, an information control system 100 includes a plurality of signal information control apparatus 2_1, 2_2, . . . , 2_n mounted in a plurality of signals (traffic signals) 1_1, 1_2, . . . , 1_n and a signal information control server 3. The plurality of signal information control apparatus 2_1, 2_2, . . . , 2_n and the signal information control server 3 are communicably connected to each other through a network NW.

In addition, the plurality of signal information control apparatus 2_1, 2_2, . . . , 2_n and the signal information control server 3 can communicate with a plurality of mobile communication devices 5_1, . . . , 5_m, which is mounted in a plurality of vehicles 4_1, . . . , 4_m, through the network NW. In addition, although a communication device with a car navigation function and the like mounted in a vehicle is described as an example of the mobile communication devices 5_1, . . . , 5_m herein, the present invention is not limited to this, and each of the mobile communication devices 5_1, . . . , 5_m may be a personal computer or the like of a user in a vehicle.

Figure 2:
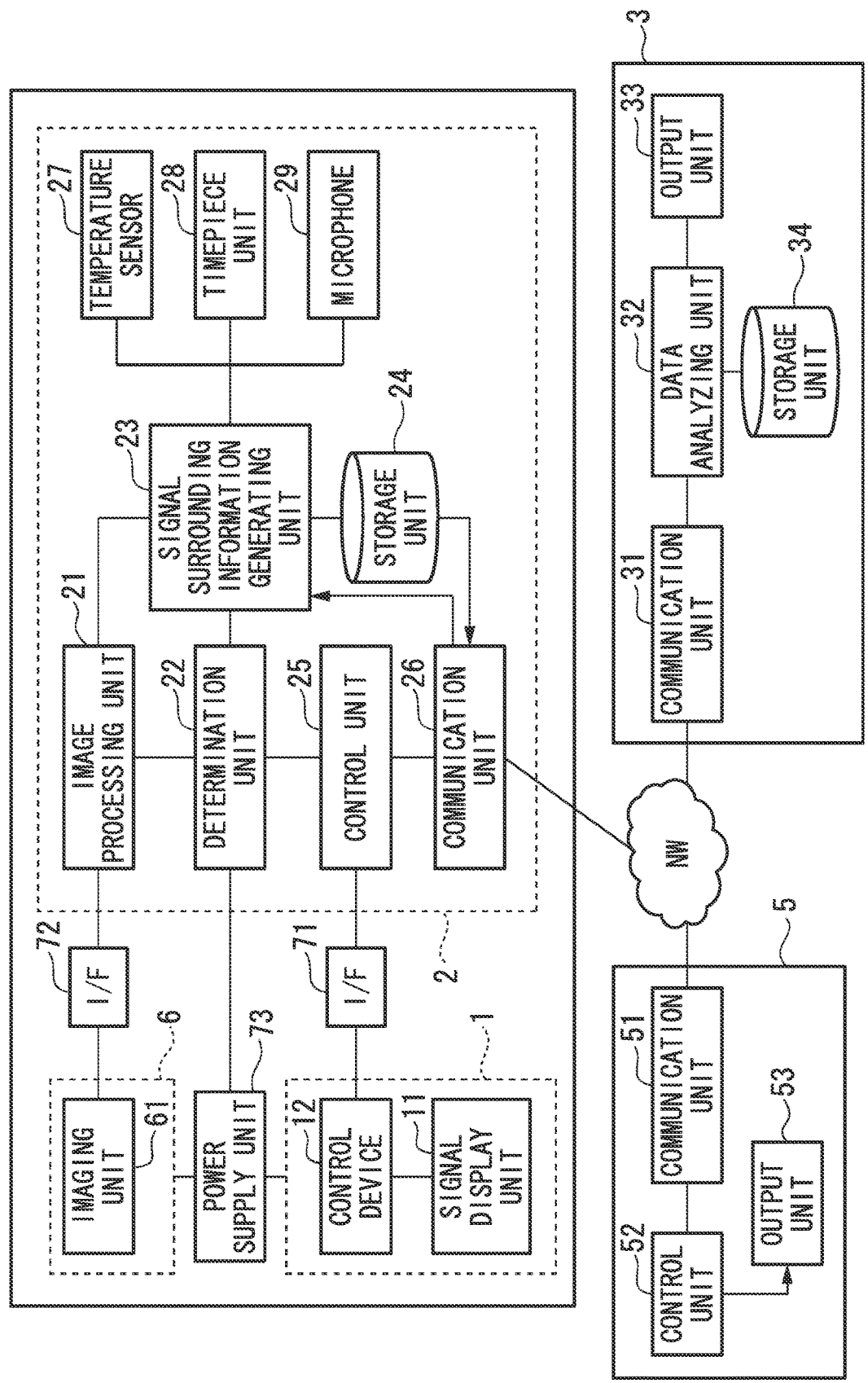
FIG. 2 is a block diagram showing each configuration of the information control system related to the first embodiment of the present invention.

Next, the configuration of the plurality of signals 1_1, 1_2, . . . , 1_n, the plurality of signal information control apparatus 2_1, 2_2, . . . , 2_n, and the mobile communication devices 5_1, . . . , 5_m will be described with reference to FIG. 2. FIG. 2 is a block diagram showing an example of the configuration.

Moreover, for convenience of explanation, the following explanation will be given in a state where an example of a signal applicable to the plurality of signals 1_1, 1_2, . . . , 1_n is set as a signal (traffic signal) 1, an example of a signal information control apparatus applicable to the plurality of signal information control apparatus 2_1, 2_2, . . . , 2_n is set as a signal information control apparatus 2, and an example of a mobile communication device applicable to the plurality of mobile communication devices 5_1, . . . , 5_m is set as a the mobile communication device 5.

As shown in FIG. 2, the signal information control apparatus 2 and an imaging apparatus 6 are fixed to the signal 1. The signal 1 and the signal information control apparatus 2 are connected to each other through an I/F (interface) 71. The signal information control apparatus 2 and the imaging apparatus 6 are connected to each other through an I/F 72.

This signal 1 includes a signal display unit 11 and a control device 12. The signal display unit 11 includes light emitting sections which emit light of green (or blue), red, yellow, and the like and is controlled by the control device 12 so that the light emitting section of each color emits light at a predetermined timing. The control device 12 controls the light emitting section of each color of the signal display unit 11 so that predetermined signal display can be performed. This control device 12 may control the light emitting section of each color to emit light according to a timing determined in advance, or may control the light emitting section of each color to emit light according to a control signal input from the signal information control apparatus 2.

The imaging apparatus 6 includes an imaging unit 61 which is a camera capable of capturing a moving image or an image, for example. This imaging unit 61 captures an image or a video image near an intersection where the signal 1 is fixed, and outputs the captured image, which is obtained by imaging, to the signal information control apparatus 2 through the I/F 72. In addition, when an object to be analyzed is a vehicle, a high-resolution camera capable of detecting the specific features indicating the license plate number, vehicle type, and the like by image processing is used as the imaging apparatus 6. In addition, it is preferable for the imaging apparatus 6 to have high sensitivity to detect the specific features of an object to be analyzed even in the case of imaging at night and to have high sensitivity to detect the specific features even in the case of a vehicle traveling at the high speed.

The imaging unit 61 acquires and outputs the captured image data at intervals of 1/60 second, for example.

The signal information control apparatus 2 includes an image processing unit 21, a determination unit 22, a signal surrounding information generating unit 23, a storage unit 24, a control unit 25, a communication unit 26, a temperature sensor 27, a timepiece unit 28, and a microphone 29. A signal ID (identification) which is a unique identification number is given to the signal information control apparatus 2. This signal ID is information for identifying each signal information control apparatus 2 and is also information matched with the position where the signal information control apparatus 2 is placed.

In the temperature sensor 27, a sensor section which detects the temperature is mounted in the signal 1 in a state exposed to the outside of the signal 1, and the temperature sensor 27 detects a temperature near the signal 1 and outputs the temperature information indicating this temperature to the signal surrounding information generating unit 23.

The timepiece unit 28 measures date and time and outputs the information indicating the measured date and time to the signal surrounding information generating unit 23.

The microphone 29 is mounted in the signal 1 in a state exposed to the outside of the signal 1, and the microphone 29 detects a sound near the signal 1 and outputs the sound information indicating this sound to the signal surrounding information generating unit 23.

The captured image data acquired by the imaging apparatus 6 is input to the image processing unit 21 through the I/F 72, and the image processing unit 21 detects an object to be analyzed which is present within an image of the captured image data. For example, the image processing unit 21 detects an object which moves (moving object), such as a vehicle or a person, as an object to be analyzed.

In addition, the image processing unit 21 calculates a motion vector of the captured image data which continues in time series, and detects an image region corresponding to the moving object on the basis of the motion vector and also detects the moving speed of the moving object which is an object to be analyzed.

The image processing unit 21 assigns a unique image ID to each item of the input captured image data and also outputs the captured image data, the image ID, and the information indicating the detected moving speed to the signal surrounding information generating unit 23 in a state matched with each other. In addition, the information which is output from the image processing unit 21 and which is obtained by matching the captured image data, the image ID, and the information indicating the moving speed with each other is called image processing result information hereinafter.

The data of an image region corresponding to the object to be analyzed (here, a moving object) is input from the image processing unit 21 to the determination unit 22. The determination unit 22 determines the information regarding the moving object included in the image region by performing pattern recognition on the data of the image region and outputs the determination result information indicating this determination result.

For example, the determination unit 22 determines the number of moving objects, type (a vehicle or a person) of a moving object, and the attribute of a moving object on the basis of the data of the image region corresponding to the object to be analyzed (moving object) detected by the image processing unit 21 and outputs the determination result information indicating the number, types, and attributes of moving objects.

That is, when the type of an object to be analyzed is a vehicle, the determination unit 22 acquires the attributes of the vehicle, such as the type (a bicycle, a large motorbike, a motor scooter, a sedan type automobile, a minivan type automobile, a light truck, or a heavy truck), a vehicle body color, the license plate number, the number of occupants, driver's sex, driver's age, and the like by pattern recognition, for example. When the type of an object to be analyzed is a person, the determination unit 22 acquires the attributes of the person, such as, for example, sex, age, height, clothing, moving method (on foot, a bicycle, or a motorbike), belongings (kinds of belongings, such as a baby carriage or a stick), and the like by pattern recognition.

In addition, the determination unit 22 determines the weather at the time of imaging by analyzing the captured image data input from the image processing unit 21. For example, the determination unit 22 determines the weather at the time of imaging among sunny, cloudy, rain, and snow on the basis of the brightness, color of the sky, and the existence of rain or snow, or the like of captured image data.

The signal surrounding information generating unit 23 writes the input information in, for example, a table of signal surrounding information shown in FIG. 3, a table of vehicle attribution information shown in FIG. 4, and a table of person attribution information shown in FIG. 5 all of which are stored in the storage unit 24 in advance.

The image processing result information acquired by the image processing unit 21 and the determination result information acquired by the determination unit 22 are input to the signal surrounding information generating unit 23, and the signal surrounding information generating unit 23 writes the image processing result information and the determination result information in each corresponding table of the signal surrounding information, the vehicle attribution information, and the person attribution information.

In addition, the signal surrounding information generating unit 23 writes each item of the captured image data in each corresponding table of the signal surrounding information table, the vehicle attribution information table, and the person attribution information table together with the temperature information indicating the temperature near the signal 1 detected by the temperature sensor 27, the time information indicating a time measured by the timepiece unit 28, and the sound information indicating the sound near the signal 1 acquired by the microphone 29, respectively.

Here, the table of signal surrounding information will be described with reference to FIG. 3. In addition, an example of the information based on the captured image data acquired at intervals of 5 minutes among the captured image data continuously acquired at intervals of 1/60 second by the imaging apparatus 6 is shown herein. The present invention is not limited to the above-described configuration, and image processing result information and determination result information based on all items of the captured image data may be made to match the table of signal surrounding information, the table of vehicle attribution information, and the table of person attribution information. In addition, the information based on the captured image data acquired at certain fixed intervals may be made to match each table, or only the information acquired on the basis of the captured image data acquired when a moving object is detected by the image processing unit 21 may be made to match each table.

As shown in FIG. 3, the table of signal surrounding information is a table in which an image ID, date and time, the number of vehicles, the number of persons, vehicle attribution information, person attribution information, the weather, temperature, a noise level, and a signal lighting color are matched with each other.

The date and time is information indicating the date and time at which the captured image data of a corresponding image ID is acquired by the imaging apparatus 6. Moreover, regarding the date and time, date and time at which the captured image data is input from the imaging apparatus 6 to the signal information control apparatus 2 through the I/F 72 may be set as an imaging timing. The date and time is date and time measured by the timepiece unit 28.

The number of vehicles is the number of vehicles included in the captured image data of the corresponding image ID.

The number of persons is the number of persons included in the captured image data of the corresponding image ID.

The vehicle attribution information includes a vehicle ID of each vehicle included in the captured image data of the corresponding image ID. This vehicle ID is unique information assigned to each vehicle within an image, and is an identifier for matching each vehicle with its attribution information with reference to the table of vehicle attribution information shown in FIG. 4.

The person attribution information includes a person ID of each person included in the captured image data of the corresponding image ID. This person ID is unique information assigned to each person within an image, and is an identifier for matching each person with its attribution information with reference to the table of person attribution information shown in FIG. 5.

The weather is information indicating the weather determined by the determination unit 22. In addition, when the information indicating the weather of an area where the signal 1 is placed is received from an external server, which is connected thereto through the network NW, by the communication unit 26, the weather information may be the information obtained by the communication unit 26.

The temperature is information indicating a temperature detected by the temperature sensor 27 when the captured image data is imaged by the imaging apparatus 6.

The noise level is information indicating the sound volume of sound information determined by the signal information control apparatus 2 on the basis of the sound information acquired by the microphone 29.

The signal lighting color indicates a color (green, red, yellow) lit by the signal display unit 11 of the signal 1 when the captured image data of the corresponding image ID is imaged. The information indicating the signal lighting color is included in a control signal output from the control unit 25 to the signal 1, is output from the control unit 25 to the determination unit 22, and is input from the determination unit 22 to the signal surrounding information generating unit 23 together with determination result information.

Next, the table of vehicle attribution information will be described with reference to FIG. 4.

As shown in FIG. 4, the table of vehicle attribution information is a table in which a vehicle ID, a license plate number, a vehicle type, a vehicle body color, the number of occupants, driver's sex, driver's age, and traveling speed are matched with each other.

The vehicle ID is information which specifies each vehicle included in the captured image data of the corresponding image ID.

The license plate number, the vehicle type, the vehicle body color, the number of occupants, the driver's sex, the driver's age, and the traveling speed are information indicating the attributes of a vehicle indicated by the vehicle ID.

Next, the table of person attribution information will be described with reference to FIG. 5.

As shown in FIG. 5, the person attribution information table is a table in which a person ID, sex, age, height, clothing, moving method (on foot, a bicycle, or a motorbike), belongings (kinds of belongings, such as a baby carriage or a stick), and the walking speed are matched with each other.

The person ID is information which specifies each person included in the captured image data of the corresponding image ID.

The age, sex, height, clothing, moving method, belongings, and walking speed are information indicating the attributes of a person indicated by the person ID.

Referring back to FIG. 2, the storage unit 24 stores a table of signal surrounding information, a table of vehicle attribution information, a table of person attribution information, and the captured image data matched therewith. In addition, the storage unit 24 stores a signal ID assigned in advance to each signal information control apparatus 2.

The control unit 25 generates a control signal for controlling the lighting timing of a light emitting section of each color of the signal display unit 11 so that predetermined signal display of the signal 1 is performed, and outputs the control signal to the signal 1 through the I/F 71.

The communication unit 26 is communicably connected to the signal information control server 3 through the network NW. The communication unit 26 transmits the table of signal surrounding information, the table of vehicle attribution information, the table of person attribution information, and the captured image data, which are stored in the storage unit 24, to the signal information control server 3 periodically or in response to the request from the signal information control server 3. The communication unit 26 transmits the transmission information so as to match the signal ID.

A power supply unit 73 supplies stored electric power to the signal 1, the signal information control apparatus 2, and the imaging apparatus 6.

The signal information control server 3 includes a communication unit 31, a data analyzing unit 32, an output unit 33, and a storage unit 34.

The communication unit 31 is communicably connected to the signal information control apparatus 2 through the network NW. The communication unit 31 outputs to the data analyzing unit 32 the table of signal surrounding information, the table of vehicle attribution information, the table of person attribution information, and the captured image data received from the signal information control apparatus 2.

The data analyzing unit 32 stores the table of signal surrounding information, the table of vehicle attribution information, the table of person attribution information, and the captured image data, which have been received from the signal information control apparatus 2 through the communication unit 31, in the storage unit 34. The data analyzing unit 32 performs various kinds of data analyses, which will be described later, on the basis of the information stored in the storage unit 34 and generates the analysis result information, which is based on the attributes of the object to be analyzed, on the basis of the determination result information and the like.

For example, the output unit 33 is a display device, such as a liquid crystal display, or a data communication unit that transmits the information, image data, or the like to an external device or the mobile communication device 5 and outputs the analysis result information generated by the data analyzing unit 32. For example, when the analysis result information corresponding to a certain vehicle is generated by the data analyzing unit 32, the output unit 33 transmits the analysis result information to the vehicle. In addition, the output unit 33 transmits the captured image data corresponding to the certain vehicle to this vehicle on the basis of the analysis result information.

The storage unit 34 stores the table of signal surrounding information, the table of vehicle attribution information, the table of person attribution information, and the captured image data received from the signal information control apparatus 2. This storage unit 34 includes a table in which each signal ID and the position, at which the signal 1 indicated by the signal ID is placed, are matched with each other.

The mobile communication device 5 includes a communication unit 51, a control unit 52, and an output unit 53.

The communication unit 51 is communicably connected to the signal information control apparatus 2 and the signal information control server 3 through the network NW. The communication unit 51 outputs to the control unit 52 the captured image data received from the signal information control apparatus 2 or the analysis result information received from the signal information control server 3.

The control unit 52 performs control to output the captured image data and the analysis result information, which have been received through the communication unit 51, to the output unit 53.

The output unit 53 is a data output unit that outputs the data to a display device or an external display device, for example, and is controlled by the control unit 52 and outputs the captured image data and the analysis result information.

Figure 6:
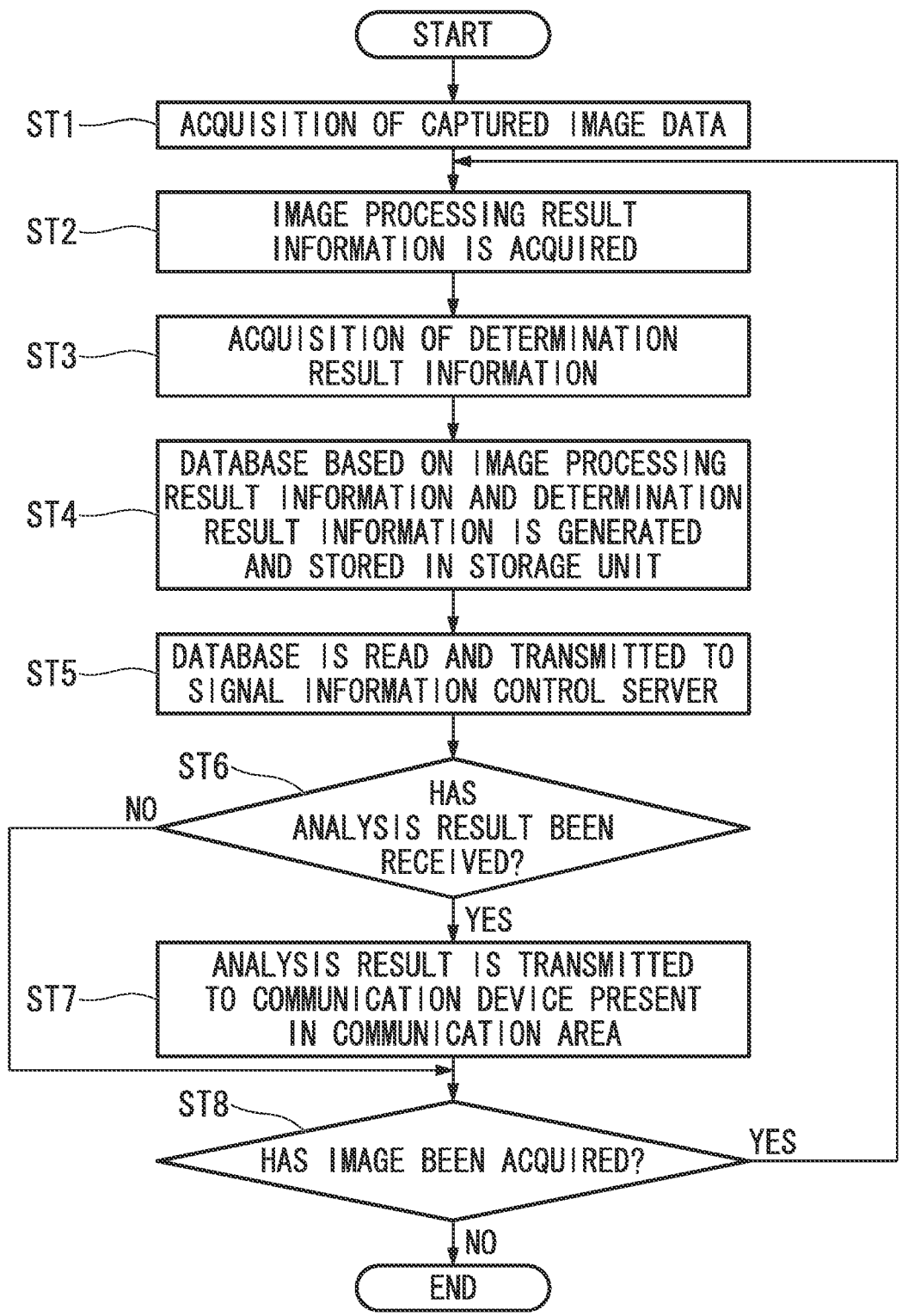
FIG. 6 is a flow chart for explaining the processing flow of a signal information control apparatus related to the first embodiment of the present invention.

Next, processing of the signal information control apparatus 2 will be described with reference to FIG. 6. FIG. 6 is a flow chart for explaining an example of the processing flow of the signal information control apparatus 2.

As shown in FIG. 6, the imaging unit 61 of the imaging apparatus 6 images an image near the intersection. Then, the captured image data of the captured image is input to the image processing unit 21 of the signal information control apparatus 2 through the I/F 72 (step ST1). The image processing unit 21 assigns a unique image ID to the input captured image data. For example, the following explanation will be given using the case where the image processing unit 21 assigns an image ID "0002" to the input captured image data as an example.

The image processing unit 21 calculates a motion vector of the captured image data (image ID "0002") and the captured image data (for example, an image with an image ID "0001") acquired in the past which continues in time series. The image processing unit 21 detects an image region corresponding to the moving object on the basis of the calculated motion vector and also calculates the moving speed of the moving object. For example, the image processing unit 21 detects 20 image regions corresponding to the moving object and calculates the moving speed of each image region.

That is, the image processing unit 21 acquires the image processing result information including the captured image data, the image ID "0002", data indicating the image region corresponding to the moving object (for example, information which specifies corresponding pixels and the pixel value), and information indicating the moving speed of each image region (step ST2).

Then, the image processing unit 21 matches the captured image data, the image ID "0002", and the data indicating the image region corresponding to the moving object with each other and outputs them to the determination unit 22. In addition, the image processing unit 21 matches the captured image data, the image ID "0002", and the information indicating the moving speed of each image region with each other and outputs them to the signal surrounding information generating unit 23.

Then, the determination unit 22 determines the information regarding the moving object included in the image region by performing pattern recognition on the data of the image region corresponding to the moving object input from the image processing unit 21 and outputs the determination result information indicating the determination result (step ST3).

For example, the determination unit 22 determines that the data of each of the plurality of image regions corresponding to the moving object is data of an image region indicating the data of an image region, which indicates 15 vehicles, and five persons by performing pattern recognition for determining the type and the number of moving objects.

In addition, the determination unit 22 determines the attributes indicated by the data of the plurality of image regions corresponding to the vehicle, such as the vehicle type of the vehicle, a vehicle body color, the license plate number, the number of occupants, driver's sex, and driver's age, by performing pattern recognition for determining these attributes of the moving object (vehicle) determined in advance. In addition, the determination unit 22 determines the attributes indicated by the data of the plurality of image regions corresponding to a person, such as the age of the person, by performing pattern recognition for determining these attributes of the moving object (person) determined in advance. In addition, the determination unit 22 determines the weather at the time of imaging by analyzing the captured data input from the image processing unit 21.

Then, the signal surrounding information generating unit 23 generates the table of signal surrounding information, the table of vehicle attribution information, and the table of person attribution information on the basis of the image processing result information acquired by the image processing unit 21, the determination result information acquired by the determination unit 22, the temperature information indicating the temperature near the signal 1 detected by the temperature sensor 27, the time information indicating a time measured by the timepiece unit 28, and the sound information indicating the sound near the signal 1 acquired by the microphone 29. That is, the signal surrounding information generating unit 23 stores the table of signal surrounding information, the table of vehicle attribution information, and the table of person attribution information in the storage unit 24 so as to match the input information (step ST4).

Then, the communication unit 26 gives a signal ID to the table of signal surrounding information, the table of vehicle attribution information, the table of person attribution information, and the captured image data, which are stored in the storage unit 24, and transmits them to the signal information control server 3 (step ST5).

Then, the communication unit 26 determines whether or not the analysis result information, which is a result of data analysis of the signal information control server 3, has been received (step ST6). When the analysis result information has been received (step ST6—YES), the communication unit 26 transmits the analysis result information to the mobile communication device 5 by radio communication (step ST7).

Then, when the new captured image data is input from the imaging apparatus 6 (step ST8—YES), the signal information control apparatus 2 returns to step ST2 again to repeat processing.

Figure 7:
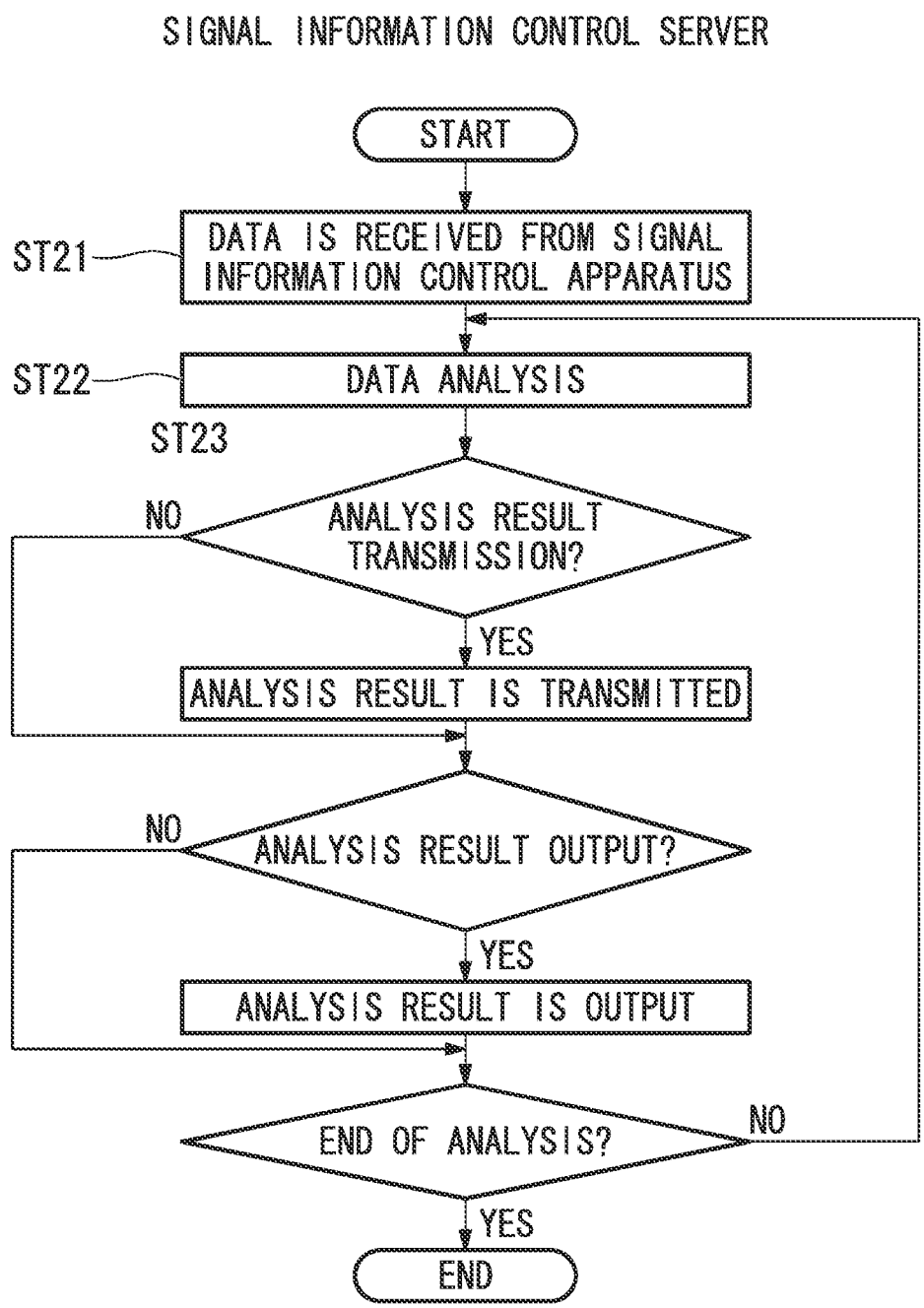
FIG. 7 is a flow chart for explaining the processing flow of a signal information control server related to the first embodiment of the present invention.

Next, processing of the signal information control server 3 will be described with reference to FIG. 7. FIG. 7 is a flow chart for explaining an example of the processing flow of the signal information control server 3.

As shown in FIG. 7, the communication unit 31 of the signal information control server 3 transmits a signal which requests transmission of the acquired information, for example, to the signal information control apparatus 2 and receives the table of signal surrounding information, the table of vehicle attribution information, the table of person attribution information, and the captured image data received from the signal information control apparatus 2 (step ST21). The communication unit 31 outputs the received information to the data analyzing unit 32.

The data analyzing unit 32 stores the table of signal surrounding information, the table of vehicle attribution information, the table of person attribution information, and the captured image data, which have been received from the signal information control apparatus 2 through the communication unit 31, in the storage unit 34 and performs desired data analysis, which will be described later, on the basis of the information stored in the storage unit 34 (step ST22).

When transmitting the analysis result information acquired by data analysis to the mobile communication device 5 (step ST23—YES), the data analyzing unit 32 transmits the analysis result information to the signal information control apparatus 2, which is indicated by the signal ID and from which the data has been transmitted in step ST21, through the communication unit 31 (step ST24).

In addition, when transmitting the analysis result information acquired by data analysis to the output unit 33 (step ST25—YES), the data analyzing unit 32 displays an image indicating the analysis result on a display screen of the output unit 33, for example (step ST26). In addition, as described above, the output unit 33 may transmit the analysis result information to the corresponding mobile communication device 5 according to the analysis result information, or may transmit the captured image data to the corresponding mobile communication device 5. In this case, the output unit 33 may transmit the analysis result information or the captured image data to the corresponding mobile communication device 5 directly through the network NW, or may transmit the analysis result information or the captured image data to the corresponding mobile communication device 5 indirectly through the signal information control apparatus 2.

Here, when data analysis is not ended, the process returns to step ST22 to repeat processing (step ST27—NO).

Figure 8:
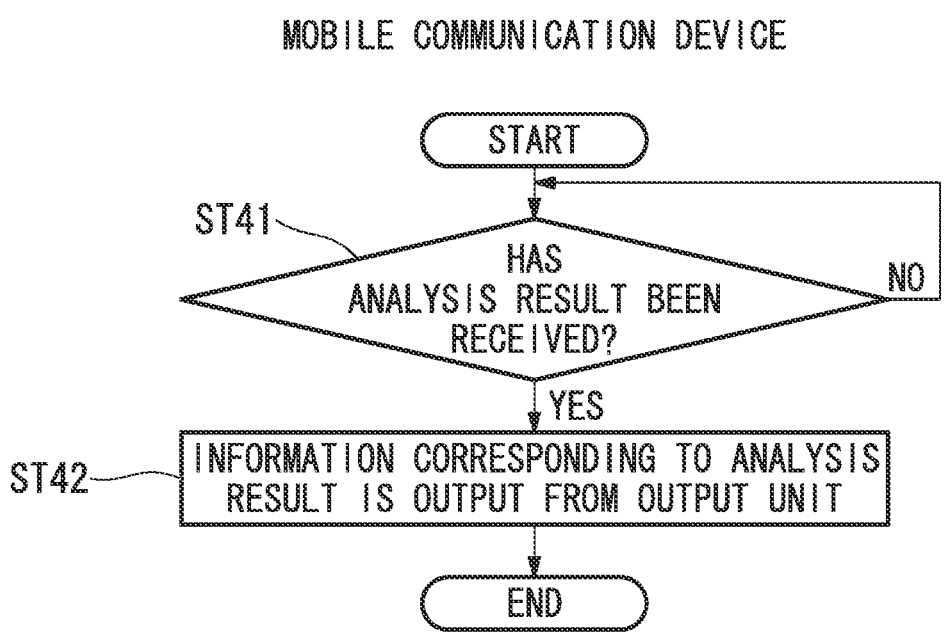
FIG. 8 is a flow chart for explaining the processing flow of a mobile communication device related to the first embodiment of the present invention.

Next, processing of the mobile communication device 5 will be described with reference to FIG. 8. FIG. 8 is a flow chart for explaining an example of the processing flow of the mobile communication device 5.

The communication unit 51 of the mobile communication device 5 performs radio communication with the communication unit 26 of the signal information control apparatus 2. When the transmission information is received in the area of communication with the signal information control apparatus 2 (step ST41—YES), the communication unit 51 of the mobile communication device 5 outputs the information to the control unit 52.

For example, when the communication unit 51 receives from the signal information control apparatus 2 the analysis result information which is transmitted from the signal information control server 3 to the signal information control apparatus 2, the control unit 52 displays an image indicating the analysis result on a display screen of the output unit 53, for example (step ST42).

Moreover, as described above, the mobile communication device 5 may receive the information or data, which is directly transmitted from the output unit 33 of the signal information control server 3, without being limited to the above method.

Here, data analysis by the data analyzing unit 32 of the signal information control server 3 will be described. The data analyzing unit 32 can execute at least one of the data analyses described below.

<Data Analysis for Monitoring the Driving Conditions of a Traveling Vehicle>

The data analyzing unit 32 of the signal information control server 3 determines a dangerous area where a traffic accident tends to occur by data analysis, for example.

For example, the data analyzing unit 32 calculates the incidence rate of sudden braking by a vehicle, which is an object to be analyzed, on the basis of the determination result information by statistical processing and acquires it as analysis result information. In addition, the data analyzing unit 32 calculates the incidence rate of sudden braking on the basis of the position corresponding to the signal ID by statistical processing for each area and acquires it as analysis result information.

Specifically, the data analyzing unit 32 counts the number of vehicles, on which the sudden braking are hit, by the change in the traveling speed of each vehicle on the basis of the traveling speed of the table of vehicle attribution information. The data analyzing unit 32 performs statistical processing of the rate of vehicles, on which the sudden braking are hit, for each intersection.

The analysis result information indicating the rate of vehicles on which the sudden braking are hit for each area, which has been acquired as described above, is useful information in that it is predicted that there is a possibility of a traffic accident at the intersection with a high rate of vehicles on which the sudden braking are hit and warning display or the like indicating the danger at the intersection can be performed.

In addition, the signal information control server 3 may make the signal information control apparatus 2, which is mounted in the signal 1 at the intersection with a high rate of vehicles on which the sudden braking are hit, transmit the information for displaying a warning message to the mobile communication device 5 of a vehicle, which is passing through the intersection, on the basis of the analysis result of the data analyzing unit 32.

In addition, the data analyzing unit 32 may detect the traveling speed of the vehicle on the basis of the information of tables of vehicle attribution information transmitted from the signal information control apparatus 2 of the plurality of adjacent signals 1 and may specify a vehicle on which the sudden braking is hit.

For example, the data analyzing unit 32 determines a vehicle indicating the same license plate number, vehicle type, vehicle body color, and the like to be the same vehicle on the basis of the information of tables of vehicle attribution information received from the signal information control apparatus 2_1, 2_2, and 2_3 mounted in the signals 1_1, 1_2, and 1_3 which are disposed continuously in the traveling direction of the lane. The data analyzing unit 32 can determine whether or not the vehicle decelerates rapidly by comparing the traveling speed when the vehicle travels between the signals 1_1 and 1_2, the traveling speed when the vehicle travels between the signals 1_2 and 1_3, and the traveling speed immediately before the signal 1_3, and the like.

In addition, without being limited to the vehicles on which the sudden braking are hit, the data analyzing unit 32 may detect a vehicle traveling in a state deviating from the middle lane, a vehicle traveling while passing other vehicles, a bicycle or a person crossing the roadway, and the like by analyzing the captured image data and the detection rate thereof statistically. Such information is useful information in that a location, at which dangerous driving and the like occur, can be discovered.

In addition, the data analyzing unit 32 may determine a possibility of collision by calculating the traveling speeds of vehicles entering the intersection from the opposite directions. For example, the data analyzing unit 32 detects at least two vehicles, each of which is the object to be analyzed and enter the intersection from different directions, on the basis of the determination result information, calculates a possibility of collision of the vehicles at the intersection on the basis of the moving speeds of the vehicles, and acquire it as analysis result information.

Specifically, it is assumed that signal information control apparatus 2_11, 2_12, and 2_13, which are mounted in signal 1_11, 1_12, and 1_13 disposed continuously in the traveling direction of a first lane, and signal information control apparatus 2_14, 2_15, and 2_16, which are mounted in signal 1_14, 1_15, and 1_16 disposed continuously in a second lane crossing the first lane at the intersection U. In this case, the signals 1_13 and 1_16 are set at the same intersection U and control the flow of traffic in the first and second lanes, respectively.

The data analyzing unit 32 determines a vehicle indicating the same license plate number, vehicle type, vehicle body color, and the like to be the same vehicle on the basis of the information of the table of vehicle attribution information and detects a vehicle A entering the intersection U from the first lane and a vehicle B entering the intersection U from the second lane. The data analyzing unit 32 calculates the traveling speeds of the vehicles A and B and determines whether or not the timing at which the vehicles A and B enter the intersection U is the same when the vehicles A and B enter the intersection U at the traveling speeds. When the entrance timing is the same, the data analyzing unit 32 determines that the possibility of collision is high and transmits the analysis result information, which indicates transmission of a message prompting slowing down because of the risk of collision, to the signal information control apparatus 2 of the signal 1 in the lane in which the vehicles A and B are traveling. The signal information control apparatus 2 which receives this analysis result information transmits a message, which prompts slowing down because of the risk of collision, to the vehicle A or B traveling in the communications area.

In addition, the data analyzing unit 32 may calculate the existence of traffic congestion and the length of traffic congestion on the basis of the number of vehicles and the traveling speed of the table of signal surrounding information.

For example, the data analyzing unit 32 generates the information regarding road congestion caused by vehicles on the basis of the determination result information and acquires it as analysis result information.

When a plurality of vehicles whose traveling speeds are equal to or lower than a fixed speed are detected, the data analyzing unit 32 calculates the length of these vehicles in the traveling direction of the lane. In addition, the data analyzing unit 32 reads the road information stored in the storage unit 34 in advance, specifies the road where the traffic congestion is occurring, and generates the congestion information indicating the road where traffic congestion is occurring. The data analyzing unit 32 transmits the congestion information to the mobile communication device 5 through the network NW.

The mobile communication device 5 is a device with a car navigation function, for example. The mobile communication device 5 receives the congestion information and outputs the information indicating that traffic congestion is occurring on the basis of this congestion information. In addition, the mobile communication device 5 notifies a user of a path change when it is determined that traffic congestion is occurring at the current position at the time of traveling or in a path to the destination on the basis of the congestion information. The table of signal surrounding information, the table of vehicle attribution information, and the table of person attribution information are useful information in that the traffic congestion can be reduced when the user changes a path according to the above.

In addition, the data analyzing unit 32 may detect an illegally parked vehicle on the basis of the traveling speed and the vehicle attribution information of the table of signal surrounding information.

For example, the data analyzing unit 32 acquires the information regarding a vehicle in violation of traffic rules, among vehicles which are objects to be analyzed, as analysis result information on the basis of the determination result information.

In the determination result of the determination unit 22, the data analyzing unit 32 detects a parked vehicle on the basis of the traveling speed in a plurality of items of the captured image data. When it is determined that the parked vehicle is a vehicle which has been parked exceeding a period of time in a no parking area, the data analyzing unit 32 reads the information including the license plate number, the vehicle type, and the like, which indicates the attributes included in the vehicle attribution information, from the table of vehicle attribution information and acquires it as traffic violation information.

In addition, the data analyzing unit 32 can acquire useful information by data analysis in order to crack down on traffic violations, such as speeding, signal violation, and other driving violations, as well as parking violations.

For example, when it is determined that a specific vehicle is traveling in a speed equal to or higher than the regulation speed on the basis of the information transmitted from the plurality of signal information control apparatus 2, the data analyzing unit 32 reads the information specifying the vehicle from the table of vehicle attribution information and acquires it as traffic violation information by speeding.

In addition, when it is determined that a vehicle passing through the intersection is passing therethrough in a red state on the basis of a signal lighting color of the table of signal surrounding information transmitted from the signal information control apparatus 2, the data analyzing unit 32 reads the information specifying the vehicle from the table of vehicle attribution information and acquires it as traffic violation information by ignoring the signal.

In addition, when the data analyzing unit 32 observes the traveling path and the traveling speed of each vehicle and detects a vehicle turning right at the intersection where right turn is prohibited or a vehicle entering the intersection without a halt on the basis of the information transmitted from the plurality of signal information control apparatus 2, the data analyzing unit 32 reads the information specifying the vehicle from the table of vehicle attribution information and acquires it as traffic violation information.

In addition, driving of each vehicle may be controlled on the basis of the analysis result information acquired by the data analyzing unit 32 as described above. In this case, the mobile communication device 5 is connected to a driving unit of the vehicle and controls a traveling direction, a traveling speed, and the like of the vehicle according to the analysis result information received from the signal information control server 3. For example, when it is determined that the possibility of collision is high by the analysis result information of the data analyzing unit 32, the mobile communication device 5 of the corresponding vehicle controls the driving unit of the vehicle to reduce the speed.

In addition, the data analyzing unit 32 may transmit the captured image data to the mobile communication device 5 together with the analysis result information. Then, the mobile communication device 5 mounted in the vehicle can receive, for example, the congestion information and the captured image data, which is an image of the road under traffic congestion, from the signal information control server 3.

In addition, even if there is no traffic congestion, the data analyzing unit 32 receives the information indicating the traveling path of the vehicle froth the mobile communication device 5 and acquires the captured image data transmitted from the signal information control apparatus 2 of the signal 1, which corresponds to the road along which the vehicle travels from now in this traveling path, by search. Then, the data analyzing unit 32 transmits the captured image data to the mobile communication device 5. As a result, the user can check the situation of the traveling path by an image.

<Data Analysis for Acquiring Available Data in a Store Open Plan>

The data analyzing unit 32 of the signal information control server 3 may acquire the information for analyzing a new store open plan by data analysis and output it to a computer which displays the information regarding the new store open plan, for example.

This computer displays on a display screen, for example, the trade area information, the property information, and the information indicating the traffic conditions around stores or the information indicating features of passers-by.

For example, this computer displays a map designated by the user on the display screen, reads the information relevant to this map from a database, and displays it. The information relevant to this map is information indicating the volume of people passing by or the volume of traffic in this area or the attributes or features regarding this area.

The data analyzing unit 32 of the signal information control server 3 acquires the information indicating the features of the area by analysis by associating it with this map.

For example, the data analyzing unit 32 acquires the information, which can be used in marketing analysis of the area where the signal is placed, as analysis result information on the basis of the number or attributes of objects to be analyzed based on the determination result information.

On the basis of the information indicating the date and time of the table of signal surrounding information and the information indicating the number of vehicles and the number of people, the data analyzing unit 32 calculates a volume of people passing by or the volume of traffic in the area where the signal 1 is placed, during in each period of time of a day such as morning, daytime, evening, and nighttime and acquires it as an analysis result. For example, if the volume of traffic of vehicles is large in the morning and evening, it can be estimated that those who commute in vehicles passes through the area with the signal 1. Therefore, this is useful information in that the features of the trade area can be analyzed.

In addition, the data analyzing unit 32 acquires the information indicating the features of persons passing through this area in vehicles, as an analysis result, on the basis of the vehicle type, driver's sex, or driver's age of the table of vehicle attribution information. For example, if the vehicle type is a one-box car, the driver's age is in the twenties or thirties, and the sex is female, it can be estimated that a possibility of a housewife of a large family is high. Therefore, this is useful information in that the features of the trade area can be analyzed.

In addition, the data analyzing unit 32 acquires the information indicating the features of persons passing through this area, as an analysis result, on the basis of the sex, age, moving method, and belongings of the table of person attribution information. For example, if the sex is female, the age is "twenties to thirties", and moving method is "pushing a baby carriage", it can be estimated that a possibility of a housewife with an infant is high. Therefore, this is useful information in that the features of the trade area can be analyzed.

In addition, the signal 1 is provided at the place where people or vehicles come and go in many cases. Accordingly, by using the analysis result by data analysis, marketing trends according to the characteristics of the area where the signal 1 is placed can be analyzed from the overall perspective.

As a result, in franchise business, such as a convenience store or a pharmacy, it is possible to make a plan for a new store opening at a favorable location. For example, a franchise business company performs evaluation and settlement at the time of new store open planning using the store location map information, surrounding information, trade area information, population, trade area, expected sales, a layout pattern, and the like in materials of paper media when performing new store opening. In addition, a franchise candidate also examines the profitability or growth potential in store opening using the same data.

As described above, by acquiring the information indicating the characteristics of the area from the captured image data by each signal information control apparatus 2, various kinds of information regarding a new store open plan for supporting a new store open plan can be acquired.

In addition, the data analyzing unit 32 may analyze a change in volume of people passing by according to the weather on the basis of the weather, temperature, and the number of people of the table of signal surrounding information.

In addition, the data analyzing unit 32 may analyze the atmosphere of the area statistically using the information indicating the noise level of the table of signal surrounding information. For example, the area with a low average noise level can be estimated to be a quiet residential area.

In addition, the storage unit 34 may store the information for performing pattern recognition, and the data analyzing unit 32 may perform pattern recognition on the captured image data transmitted from the signal information control apparatus 2. For example, the information which specifies the type or brand of clothes may be prepared in advance as pattern information stored in the storage unit 34, and the data analyzing unit 32 may determine the type or brand of clothing of a person included in the captured image data.

<Billing for Analysis Result Information Transmission>

The data analyzing unit 32 of the signal information control server 3 may bill the user of the mobile communication device 5 to which the analysis result information was transmitted.

For example, when the analysis result information to be transmitted to a user who joined the service for transmission of specific analysis result information in advance is acquired as a result of data analysis, the data analyzing unit 32 transmits the analysis result information to the mobile communication device 5 of the user and also stores having transmitted the analysis result information to the user in the storage unit 34. Then, for example, after the elapse of a fixed period, the data analyzing unit 32 transmits service charges, of which payment is requested to each user, to the billing center or the like according to the number of times of transmission of the analysis result information to each user, type of the transmitted information, and the like. This billing center is a center which collects the charges of the service which transmits to a user the analysis result information described previously. A server which can communicate with the signal information control server 3 is provided in the billing center. This server stores the personal information (for example, a user name or an identification number of a mobile communication device) on a user who joined the service for transmission of analysis result information and the service content (for example, type of analysis result information whose transmission is requested by the user), and the information is transmitted to the signal information control server 3.

Since the imaging apparatus 6 related to the present embodiment has high resolution and high sensitivity as described above, the signal information control apparatus 2 can acquire the detailed information, such as the type or attributes of an object to be analyzed, included in an image on the basis of the captured image data photographed by the imaging apparatus 6. As a result, the signal information control apparatus 2 can generate a table of signal surrounding information, a table of vehicle attribution information, and a table of person attribution information matched with the type, attributes, and the like of an object to be analyzed. In addition, the data analyzing unit 32 can acquire the characteristics resulting from behavior patterns of people in the area where the signal 1 is placed, by analysis, using the table of signal surrounding information, the table of vehicle attribution information, and the table of person attribution information.

Therefore, the table of signal surrounding information, the table of vehicle attribution information, the table of person attribution information, and the analysis result information acquired in this way may be used to monitor the traffic situation and to understand marketing trends according to economic trends, such as a store open plan, as described above.

According to an aspect related to the present invention, it is possible to comprehensively acquire the information regarding the area by acquiring such useful information from the signal 1 placed in most areas where people live.

In addition, the present invention is not limited to the embodiments described above, and may have the following configuration.

For example, although the configuration where the data analyzing unit 32 is mounted in the signal information control server 3 has been described as an example, the data analyzing unit 32 may be mounted in each signal information control apparatus 2. In this case, the data analyzing unit 32 mounted in the signal information control apparatus 2 may use the table of signal surrounding information, the table of vehicle attribution information, the table of person attribution information, and the captured image data which are stored in the storage unit 24 by its own signal information control apparatus 2. In addition, the data analyzing unit 32 mounted in the signal information control apparatus 2 may perform data analysis described above using both the information transmitted from other signal information control apparatus 2 and the information of its own storage unit 24.

As a result, since communication with the signal information control server 3 can be reduced, the processing speed can be improved.

In addition, although the configuration in which the signal information control apparatus 2 is mounted in the signal 1 has been described, the present invention is not limited to this, and the signal information control apparatus 2 may be mounted in the signal information control server 3. In this case, the signal information control apparatus 2 mounted in the signal information control server 3 receives the captured image data transmitted from the imaging apparatus 6 mounted in the signal 1 and performs the same processing as described above.

In addition, the signal information control apparatus 2 may have a configuration including a display device, such as a liquid crystal display or an electroluminescent display panel, and may display the information according to the analysis result information on data analysis received from the signal information control server 3.

In addition, the signal 1 may be a movable signal placed in construction sites or the like. The imaging apparatus 6 may be a camera capable of performing imaging in a range of 360°.

In addition, although only a signal for a vehicle has been described as the signal 1 in the above, the signal 1 may also be a signal when a person crosses the road (otherwise, roadway) or a signal for a train in the railroad without being limited to only the vehicle.

The mobile communication device 5 is not limited to a device mounted in a vehicle. Alternatively or additionally, the mobile communication device 5 may include a personal digital assistant, a personal computer, and other various devices with communication functions. Even if not on the vehicle, the data from the signal information control apparatus can be received through the communication device 5.

In addition, although the case where the object to be analyzed (moving object) detected by the image processing unit 21 is a vehicle or a person has been described, the object to be analyzed (moving object) is not limited to this. For example, the object to be analyzed (moving object) may be an animal, an insect, a floating object, and the like.

Second Embodiment

Figure 9:
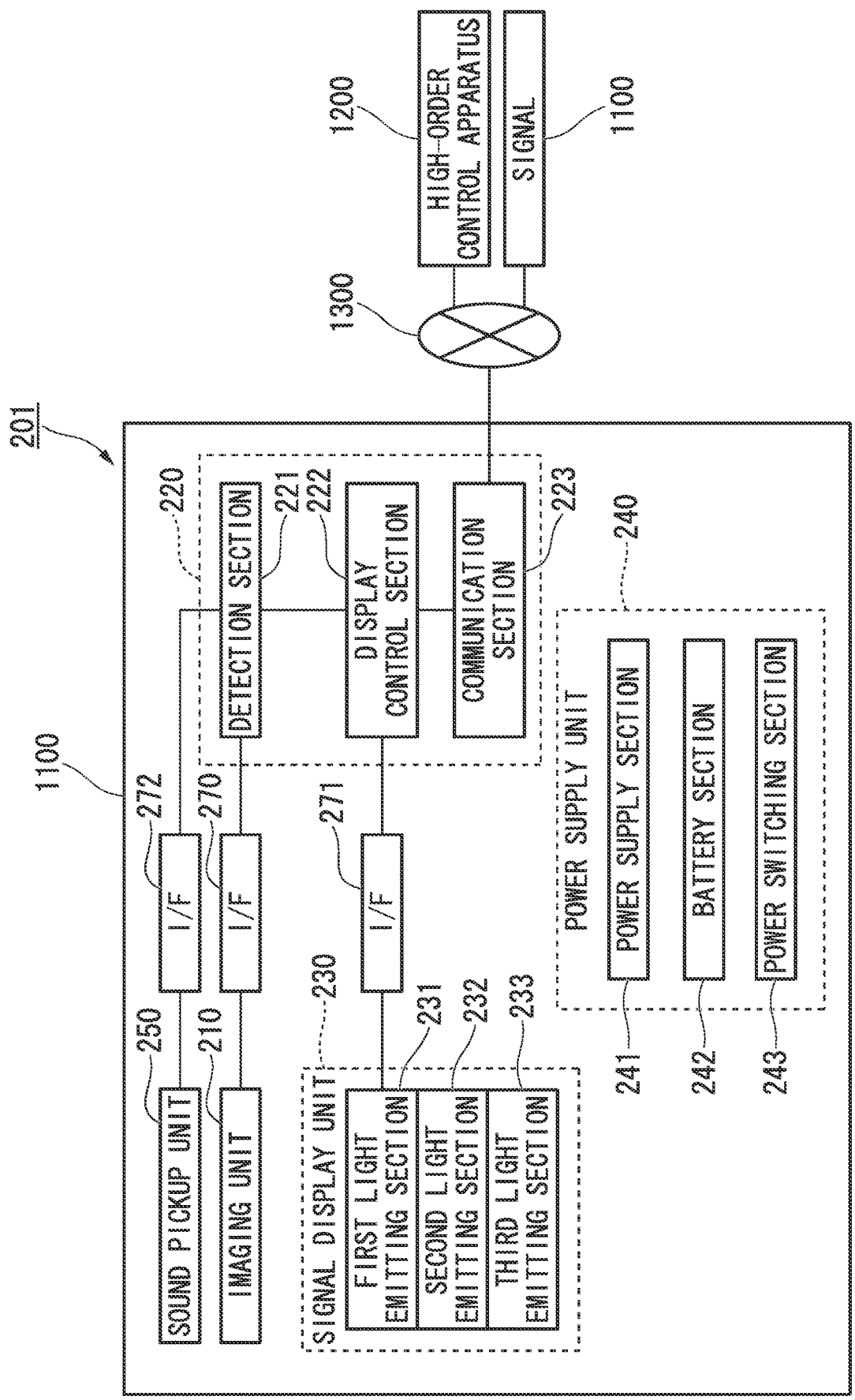
FIG. 9 is a block diagram showing the configuration of a signal system and a signal control apparatus according to a second embodiment of the present invention.

Hereinafter, a second embodiment of the present invention will be described with reference to the drawings. FIG. 9 is a schematic block diagram showing the configuration of a signal system 201 in the second embodiment of the present invention. In the signal system 201, a signal control apparatus 1100 provided in each of a plurality of signals and a high-order control apparatus 1200 are connected to each other through a communication network 1300. Hereinafter, explanation will be given referring to the signal control apparatus 1100 as a signal 1100.

Here, the explanation will be given assuming that the plurality of signals 1100 are placed on the road and each of them is identified by the identification information. The high-order control apparatus 1200 transmits a control signal, which is for controlling each signal 1100, to the signal 1100 through the communication network 1300. As a result, the high-order control apparatus 1200 can control each of the plurality of signals 1100.

The plurality of signals 1100 has the same configuration. Therefore, the configuration of one signal 1100 will be described herein. The signal 1100 includes an imaging unit 210, a control unit 220, a signal display unit 230, a power supply unit 240, and a sound pickup unit 250. The imaging unit 210 and the control unit 220 are connected to each other through an I/F (interface) 270. The control unit 220 and the signal display unit 230 are connected to each other through an I/F 271. The sound pickup unit 250 and the control unit 220 are connected to each other through an I/F (interface) 272.

The signal display unit 230 includes a first light emitting section 231, a second light emitting section 232, and a third light emitting section 233. The first light emitting section 231 lights green (or blue) and indicates that "may move" (hereinafter, referred to as "movable") at the time of lighting. The second light emitting section 232 lights yellow and indicate that "stop at the stop position at the time of lighting. However, you may move when it is not possible to stop at the stop position" (hereinafter, referred to as "stop"). The third light emitting section 233 lights red and indicates that "should not move" (hereinafter, referred to as "not movable") at the time of lighting.

The imaging unit 210 includes an imaging apparatus, such as a CCD (Charge Coupled Device) image sensor or a CMOS (Complementary Metal Oxide Semiconductor) image sensor and outputs a captured image to the control unit 220 through the I/F 270. The imaging unit 210 is fixed to the signal 1100. For example, the imaging unit 210 is fixed to the signal 1100 so as to be located at the upper, lower, left, or right side of the signal display unit 230. In addition, this imaging unit 210 may be fixed to the signal 1100 integrally with the signal display unit 230.

As an example, the imaging unit 210 performs imaging in the azimuth of 360° in the horizontal direction. In this case, the imaging unit 210 may perform photographing in the azimuth of 360° by combining a plurality of imaging apparatuses. In addition, the imaging unit 210 may perform photographing in the azimuth of 360° by performing image processing of an image captured through a specular member with a shape of a triangular pyramid, a sphere, or the like.

The sound pickup unit 250 is a sound pickup device, such as a microphone, and outputs pickup sound to the control unit 220 through the I/F (interface) 272. For example, the sound pickup unit 250 may be a sound pickup device which includes a plurality of microphones and which picks up a sound so that the direction of a sound source can be specified. The sound pickup unit 250 is fixed to the signal 1100. For example, the sound pickup unit 250 is fixed to the signal 1100 so as to be located at the upper, lower, left, or right side of the signal display unit 230. In addition, this sound pickup unit 250 may be fixed to the signal 1100 integrally with the signal display unit 230.

The power supply unit 240 supplies electric power to the imaging unit 210, the control unit 220, the signal display unit 230, and the sound pickup unit 250 which are respective components provided in the signal 1100.

The power supply unit 240 includes a power supply section 241, a battery section 242, and a power switching section 243. Electric power is supplied from the outside of the signal 1100 to the power supply section 241 through a power line. Electric power (electric charge) is accumulated in the battery section 242, and the battery section 242 outputs the accumulated electric power. For example, the battery section 242 is charged by electric power supplied to the power supply section 241 in a period for which electric power is supplied to the power supply section 241 from the outside. The battery section 242 is a secondary battery, for example.

For example, the power switching section 243 supplies electric power selected from either the power supply section 241 or the battery section 242 to each component provided in the signal 1100. The power switching section 243 detects a voltage or current of electric power supplied to the power supply section 241 and switches the power supply section 241, which supplies electric power to each component provided in the signal 1100, to either the power supply section 241 or the battery section 242 on the basis of this detected voltage or current.

Here, mode switching by the power switching section 243 will be described using FIG. 10. In addition, the following explanation will be given assuming that the case where electric power is supplied from the power supply section 241 to each component provided in the signal 1100 by the power switching section 243 is called a "first mode" and the case where electric power is supplied from the battery section 242 to each component provided in the signal 1100 by the power switching section 243 is called a "second mode".

First, when the signal 1100 starts (in FIG. 10, in the case of a state "startup"), the power switching section 243 changes the state to the first mode if first startup conditions are satisfied and changes the state to the second mode if second startup conditions are satisfied.

The first startup conditions may be conditions in which a voltage or current of electric power supplied to the power supply section 241 is larger than the threshold value set in advance, for example. In addition, the second startup conditions may be conditions in which a voltage or current of electric power supplied to the power supply section 241 is equal to or lower the threshold value set in advance, for example. That is, the first startup conditions are conditions in which electric power from the outside is supplied to the signal 1100, and the second startup conditions are conditions in which electric power from the outside is not supplied to the signal 1100.

Then, for example, the power switching section 243 detects a voltage or current of electric power supplied to the power supply section 241 when electric power is supplied from the power supply section 241 to each component provided in the signal 1100 (when the state is the first mode). Then, when the detected voltage or current becomes equal to or lower than a threshold value set in advance (when the second condition is satisfied), the power switching section 243 changes the power supply to the battery section 242 (changes the state to the second mode).

For example, the second condition corresponds to a case where a power line through which electric power is supplied to the signal 1100 is cut or a case where the facility which supplies electric power to the signal 1100 fails in a disaster or the like.

In addition, the power switching section 243 detects a voltage or current of electric power supplied to the power supply section 241 when electric power is supplied from the battery section 242 to each component provided in the signal 1100 (when the state is the second mode). Then, when the detected voltage or current becomes equal to or higher than a threshold value set in advance (when the first condition is satisfied), the power switching section 243 changes the power supply to the power supply section 241 (changes the state to the first mode).

For example, the first condition corresponds to a case where the cut power line through which electric power is supplied to the signal 1100 is connected or a case where the failure of the facility which supplies electric power to the signal 1100 ends by restoration work after a disaster.

After that, the power switching section 243 changes the state between the first and second modes. In addition, the power switching section 243 outputs to the control unit 220 the information indicating that the state is changed from the first mode to the second mode and the information indicating that the state is changed from the second mode to the first mode. Alternatively, the power switching section 243 outputs to the control unit 220 the information indicating that the current state is the first mode or the second mode. Using this information, the control unit 220 can determine whether the current mode is the first mode or the second mode.

Returning to the explanation of FIG. 9, the control unit 220 includes a detection section 221, a display control section 222, and a communication section 223. The communication section 223 receives a control signal for changing the display state of the signal display unit 230 from the high-order control apparatus 1200 through the communication network 1300. This control signal is control information indicating "movable", "stop", or "not movable", for example. That is, this control signal is control information indicating that the first light emitting section 231, the second light emitting section 232, or the third light emitting section 233 is made to emit light.

In the first mode, the display control section 222 changes the display state of the signal display unit 230 through the I/F 271 on the basis of the control signal received from the high-order control apparatus 1200 by the communication section 223. For example, in the first mode, when the control information indicating that the first light emitting section 231 is made to light is received from the high-order control apparatus 1200 through the communication section 223, the display control section 222 makes the first light emitting section 231 provided in the signal display unit 230 light and extinguishes the second and third light emitting sections 232 and 233.

The detection section 221 detects the volume of traffic on the basis of an image captured by the imaging unit 210. In the second mode, the display control section 222 changes the display state of the signal display unit 230 on the basis of the volume of traffic detected by the detection section 221.

For example, the detection section 221 detects the volume of traffic in each of a plurality of lanes on the basis of an image of the plurality of lanes captured by the imaging unit 210. In this case, for the image of the plurality of lanes captured by the imaging unit 210, the detection section 221 detects a vehicle one by one in each different lane by image processing or pattern matching technique, as an example. In addition, the detection section 221 detects the volume of traffic in each of the plurality of lanes by detecting the number of vehicles per unit time which travel in each lane.

The display control section 222 changes the display state of the signal display unit 230 on the basis of a result of comparison of the volumes of traffic in the plurality of lanes detected by the detection section 221. In this case, the display control section 222 changes the display state of the signal display unit 230 on the basis of the result of comparison of the volumes of traffic in the plurality of lanes detected by the detection section 221 so that vehicles traveling in the lane with the high volume of traffic can move with priority over vehicles traveling in the lane with the low volume of traffic.

In this way, in the first mode, the control unit 220 changes the display state of the signal display unit 230, which is fixed to the signal 1100, on the basis of the control signal received from the high-order control apparatus 1200 by the communication section 223. In addition, in the second mode, the control unit 220 changes the display state of the signal display unit 230, which is fixed to the signal 1100, on the basis of an image captured by the imaging unit 210.

Next, an example where the display control section 222 changes the display state of the signal display unit 230 on the basis of the volume of traffic detected by the detection section 221 in the second mode will be described using FIGS. 11 to 13.

Figure 11:
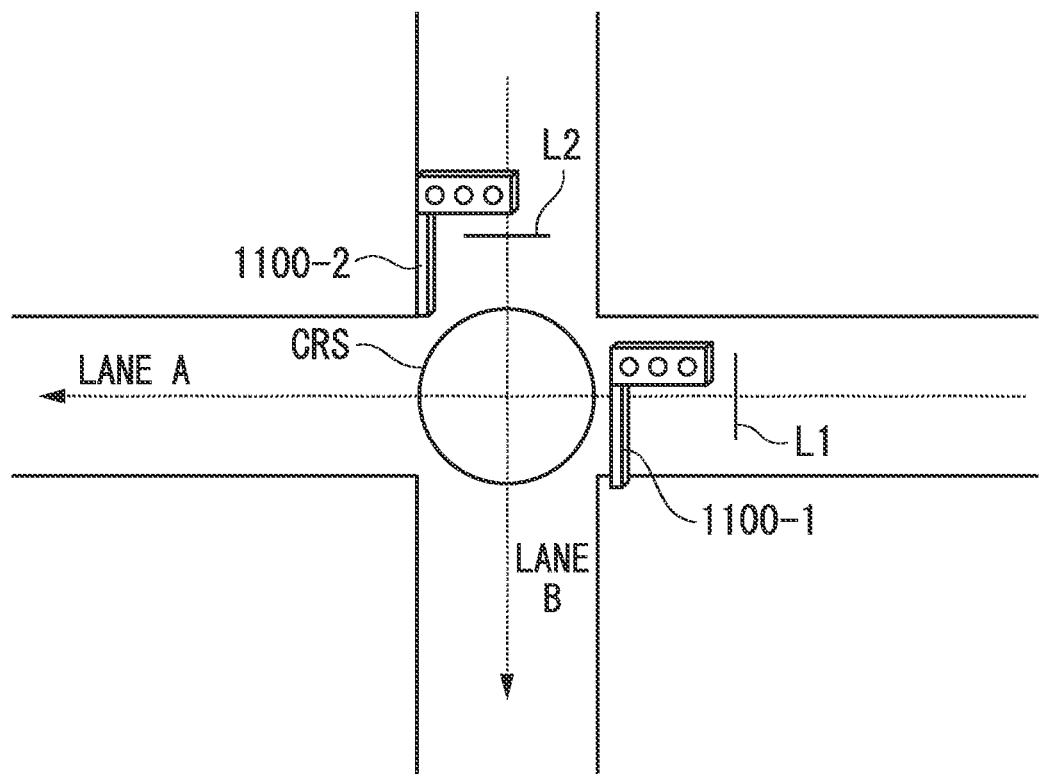
FIG. 11 is an explanatory view showing a crossroads (first example) as an example in the second embodiment of the present invention.

Here, as shown in FIG. 11, a case of two lanes which are one-way streets will be described. The lane A which is one lane of the two lanes is a lane which is a one-way street from right to left on the plane of FIG. 11. The lane B which is one lane of the two lanes is a lane which is a one-way street from top to bottom on the plane of FIG. 11. The lanes A and B cross each other at the crossroads CRS.

In addition, in FIG. 11, a signal 1100-1 is placed before the crossroads CRS in the lane A. In addition, a signal 1100-2 is placed before the crossroads CRS in the lane B. The signals 1100-1 and 1100-2 have the same configuration as the signal 1100 described above using FIG. 9.

Moreover, in FIG. 11, there is a stop line L1 before the signal 1100-1 and a stop line L2 before the signal 1100-2 at the crossroads CRS. Therefore, at the crossroads CRS, a vehicle stops before the stop line L1 and a vehicle stops before the stop line L2 according to the signal display units 230 of the signals 1100-1 and 1100-2.

Next, the volume of traffic detected by the signal 1100 will be described using FIG. 12. Here, a case where the signal display unit 230 of each of the signals 1100-1 and 1100-2 includes the first light emitting section 231, which lights green (or blue) indicating "movable", and the third light emitting section 233, which lights red indicating "not movable".

In addition, explanation herein will be given assuming that the control unit 220 of each of the signals 1100-1 and 1100-2 executes the extinguishing of the first light emitting section 231 and the lighting of the third light emitting section 233 almost simultaneously for the signal display unit 230 provided in each signal. Moreover, on the contrary, explanation will be given assuming that the control unit 220 of each of the signals 1100-1 and 1100-2 executes the lighting of the first light emitting section 231 and the extinguishing of the third light emitting section 233 almost simultaneously for the signal display unit 230 provided in each signal.

In addition, each of the signals 1100-1 and 1100-2 performs imaging in the azimuth of 360° in the horizontal direction, as described above. Therefore, the signals 1100-1 and 1100-2 can detect the volumes of traffic in the lanes A and B, respectively.

Figure 12:
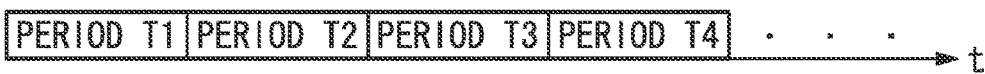
FIG. 12 is an explanatory view showing an example of the detected traffic volume in the second embodiment of the present invention.

Here, as shown in FIG. 12, the signals 1100-1 and 1100-2 repeat display states of "movable" and "not movable" alternately through each signal display unit 230, for example. Explanation herein will be given assuming that periods of the display states of "movable" and "not movable" are the same in length of time.

For example, in a period T1, the signal 1100-1 indicates "movable" through its own signal display unit 230, and the signal 1100-2 indicates "not movable" through its own signal display unit 230. Then, in a period T2, the signal 1100-1 indicates "not movable" through its own signal display unit 230, and the signal 1100-2 indicates "movable" through its own signal display unit 230. Subsequently, the signals 1100-1 and 1100-2 repeat the same operation in periods T3, T4, . . . . In addition, the periods T1, T2, T4, . . . are assumed to be the same in length of time.

Here, the detection section 221 of the signal 1100-1 detects the volume of traffic in each of the plurality of lanes on the basis of an image of the plurality of lanes captured by the imaging unit 210 of the signal 1100-1. In addition, the detection section 221 of the signal 1100-2 detects the volume of traffic in each of the plurality of lanes on the basis of an image of the plurality of lanes captured by the imaging unit 210 of the signal 1100-2.

For example, as shown in FIG. 12, the detection section 221 of the signal 1100-1 and the detection section 221 of the signal 1100-2 detect that five vehicles have passed through the lane A and no vehicle has passed through the lane B in the period T1, respectively. In addition, the detection section 221 of the signal 1100-1 and the detection section 221 of the signal 1100-2 detect that no vehicle has passed through the lane A and one vehicle has passed through the lane B in the period T2, respectively. Similarly, also in the periods T3, T4, . . . , the detection section 221 of the signal 1100-1 and the detection section 221 of the signal 1100-2 detect the volumes of traffic in the lanes A and B, respectively.

Then, the display control section 222 of the signal 1100-1 compares the volumes of traffic in the plurality of lanes detected by the detection section 221 of the signal 1100-1, and determines that the volume of traffic in the lane A is larger than that in the lane B in this case. For example, the display control section 222 of the signal 1100-1 may compare the volume of traffic in each lane on the basis of the sum or the average number of vehicles traveling in each lane in a period set in advance, such as the period T1 to the period T4.

Then, the display control section 222 of the signal 1100-1 changes the display state of the signal display unit 230 on the basis of this result so that vehicles traveling in the lane with the high volume of traffic can move with priority over vehicles traveling in the lane with the low volume of traffic. That is, in this case, since the volume of traffic in the lane A is larger than that in the lane B, the display control section 222 of the signal 1100-1 changes the display state of the signal display unit 230 so that vehicles traveling in the lane A can move with priority over vehicles traveling in the lane B.

On the other hand, the display control section 222 of the signal 1100-2 compares the volumes of traffic in the plurality of lanes detected by the detection section 221 of the signal 1100-2, and determines that the volume of traffic in the lane A is larger than that in the lane B in this case in the same manner as the display control section 222 of the signal 1100-1 does. Then, the display control section 222 of the signal 1100-2 changes the display state of the signal display unit 230 on the basis of this result so that vehicles traveling in the lane with the high volume of traffic can move with priority over vehicles traveling in the lane with the low volume of traffic. That is, in this case, since the volume of traffic in the lane A is larger than that in the lane B, the display control section 222 of the signal 1100-2 changes the display state of the signal display unit 230 so that vehicles traveling in the lane A can move with priority over vehicles traveling in the lane B in the same manner as the display control section 222 of the signal 1100-1 does.

Here, physical quantities called the volumes of traffic in a plurality of lanes are the same value as long as a measurement period is the same even if a measurement apparatus is different like the signals 1100-1 or the signal 1100-2. Therefore, values of the volumes of traffic in a plurality of lanes detected by the detection section 221 of the signal 1100-1 and the detection section 221 of the signal 1100-2 are the same value. Accordingly, on the basis of the volume of traffic detected for each of the plurality of lanes, each of the display control section 222 of the signal 1100-1 and the display control section 222 of the signal 1100-2 can change the display state of the signal display unit 230 so that vehicles traveling in the lane A can move with priority over vehicles traveling in the lane B. Thus, even when the signals 1100-1 and 1100-2 operate independently of each other and even when the signals 1100-1 and 1100-2 do not receive control signals from the high-order control apparatus, it is possible to change the display state of the signal display unit 230 appropriately on the basis of the volume of traffic detected for each of the plurality of lanes.

In addition, the display control section 222 of the signal 1100-1 and the display control section 222 of the signal 1100-2 perform the following operations, as an example, when changing the display state of the signal display unit 230 so that vehicles traveling in the lane A can move with priority over vehicles traveling in the lane B.

For example, the display control section 222 of each of the signals 1100-1 and 1100-2 changes the display state of the signal display unit 230, on the basis of the volume of traffic in each of the plurality of lanes detected by the detection section 221 of the corresponding signal 1100, so that a period for which a vehicle can move in the lane with the high volume of traffic becomes longer than that in the lane with the low volume of traffic as the ratio or difference of the volumes of traffic in the lanes increases.

In addition, on the contrary, the display control section 222 of each of the signals 1100-1 and 1100-2 changes the display state of the signal display unit 230, on the basis of the volume of traffic in each of the plurality of lanes detected by the detection section 221 of the corresponding signal 1100, so that a period for which a vehicle cannot move in the lane with the low volume of traffic becomes longer than that in the lane with the high volume of traffic as the ratio or difference of the volumes of traffic in the lanes increases.

Figure 13:
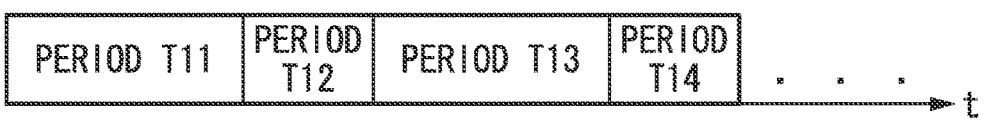
FIG. 13 is an explanatory view showing an example of periods of lighting and extinguishing of a signal lamp in the second embodiment of the present invention.

In the case of FIG. 12 described above, the display control section 222 of each of the signals 1100-1 and 1100-2 changes a period of the display state by the signal display unit 230 as shown in FIG. 13, as an example. For example, each display control section 222 changes a period of the display state by the signal display unit 230 so that the time lengths of periods T11 and T13, in which the signal display unit 230 (lane A) of the signal 1100-1 indicates "movable" and the signal display unit 230 (lane B) of the signal 1100-2 indicates "not movable" become longer than those of the periods T1 to T4 shown in FIG. 12.

On the contrary, each display control section 222 changes a period of the display state by the signal display unit 230 so that the time lengths of periods T12 and T14, in which the signal display unit 230 (lane A) of the signal 1100-1 indicates "not movable" and the signal display unit 230 (lane B) of the signal 1100-2 indicates "movable" become shorter than those of the periods T1 to T4 shown in FIG. 12. Subsequently, each display control section 222 repeats changing the display state of each signal display unit 230 in the same manner as in the case of the periods T11 to T14 until the volume of traffic changes.

Thus, the display control section 222 of the signal 1100 can change the display state of the signal display unit 230 on the basis of the volume of traffic in each of the plurality of lanes detected by the detection section 221 so that vehicles traveling in the lane with the high volume of traffic can move with priority over vehicles traveling in the lane with the low volume of traffic.

<Operation of the Signal 1100 when Changing to the Second Mode>

Figure 14:
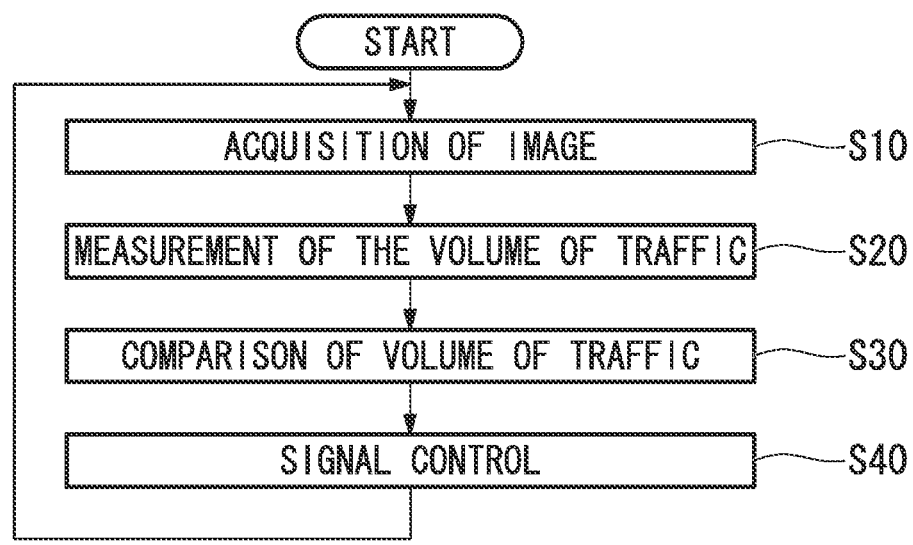
FIG. 14 is an operation diagram showing the operation of the signal according to the second embodiment of the present invention.

Next, an operation of the signal 1100 in the second mode will be described using FIG. 14. In addition, the operation of the signal 1100 in FIG. 14 is an operation of the signal 1100 when changing from the first mode to the second mode, for example, as described using FIG. 10.

First, the imaging unit 210 captures an image and outputs the captured image to the control unit 220 through the I/F 270 (step S10). Then, the detection section 221 of the control unit 220 detects the volume of traffic on the basis of the image captured by the imaging unit 210 (step S20). Then, the display control section 222 of the control unit 220 compares the volume of traffic in each of the plurality of lanes detected by the detection section 221 (step S30).

Then, the display control section 222 of the control unit 220 performs signal control by changing the display state of the signal display unit 230 on the basis of the comparison result in step S30 (step S40). In step S40, for example, the display control section 222 of the control unit 220 changes the display state of the signal display unit 230 on the basis of the result of comparison of the volumes of traffic in the plurality of lanes detected by the detection section 221 so that vehicles traveling in the lane with the high volume of traffic can move with priority over vehicles traveling in the lane with the low volume of traffic. In addition, in this step S40, the display control section 222 of the control unit 220 changes the display state of the signal display unit 230 through the I/F 271.

Subsequently, the signal 1100 repeats the processing from step S10 until it changes to the first mode.

In this way, in the second mode, the signal 1100 changes the display state of the signal display unit 230 fixed to the signal 1100 on the basis of the image captured by the imaging unit 210. Therefore, the signal 1100 according to the present embodiment can appropriately perform control to change the display state of the signal display unit 230 even when the signal 1100 cannot communicate with the high-order control apparatus and even when the signal 1100 cannot receive a control signal from the high-order control apparatus.

In addition, as shown in FIG. 12 or 13, the control unit 220 provided in each signal 1100 changes the display state of each signal display unit 230 so that the display state of the signal 1100-1 is different from the display state of the signal 1100-2.

Meanwhile, in the case of FIG. 11, the signals 1100-1 and 1100-2 need to control the signal display unit 230 of each signal 1100 using the control unit 220 of the corresponding signal 1100 so that a vehicle traveling in the lane A and a vehicle traveling in the lane B do not collide with each other at the crossroads CRS. For example, the control unit 220 of each signal 1100 needs to control the signal display unit 230 of the signal 1100 using the control unit 220 of the corresponding signal 1100 so that a vehicle traveling in the lane A and a vehicle traveling in the lane B do not move toward the crossroads CRS at the same timing.

That is, it is not allowed that both the display state of the signal 1100-1 and the display state of the signal 1100-2 indicate "movable" at the same timing. In addition, both the display state of the signal 1100-1 and the display state of the signal 1100-2 may indicate "not movable".

Therefore, the control unit 220 provided in each signal 1100 changes the display state of each signal display unit 230 such that the display state of the signal 1100-1 is different from the display state of the signal 1100-2 and both the display states do not indicate "movable" at the same timing.

As a result, a vehicle traveling in the lane A and a vehicle traveling in the lane B can alternately enter the crossroads CRS without the collision between the vehicle traveling in the lane A and the vehicle traveling in the lane B at the crossroads CRS.

Meanwhile, as described above using FIG. 12, it is necessary to make each device measure the value of the physical quantity, which is called the volume of traffic in each of the plurality of lanes, as the same value even if apparatus which measure the volume of traffic are different like the signal 1100-1 or the signal 1100-2. In order to do so, a start time, such as the period T1 for which the number of vehicles is measured, and an end time need to synchronize with each other in the signals 1100-1 and 1100-2.

For this synchronization, the signals 1100-1 and 1100-2 may be made to be able to detect a reference time by time measurement using a radio-controlled timepiece or by time measurement using a GPS (Global Positioning System). Then, each of the signals 1100-1 and 1100-2 measures an elapsed time from the detected reference time using a timepiece section present thereinside. Then, each of the signals 1100-1 and 1100-2 measures a start time, such as the period T1 for which the number of vehicles is measured, and an end time on the basis of the elapsed time measured by each timepiece section. In this way, the signals 1100-1 and 1100-2 may make the start time and the end time of the period T1 synchronized which the number of vehicles is measured between the signals 1100-1 and 1100-2.

Thus, even if devices which the volume of traffic are different, the signals 1100-1 and 1100-2 can measure the value of the physical quantity, which is called the volume of traffic in each of the plurality of lanes, as the same value. Accordingly, the signals 1100-1 and 1100-2 can change the display state of the signal display unit 230 appropriately.

In addition, in the explanation of FIG. 12, the signals 1100-1 and 1100-2 compared the volumes of traffic in a plurality of lanes when periods from the period T1 to the period T4 elapsed and changed the display state of the signal display unit 230 the on the basis of the comparison result. However, the timing at which the volumes of traffic in the plurality of lanes are compared is not limited to this. For example, the signals 1100-1 and 1100-2 may compare the volumes of traffic in the plurality of lanes every period set in advance.

This "period set in advance" may be an arbitrary period set in advance. In addition, this "period set in advance" may be set on the basis of a period, for which the display state of the signal display unit 230 is changed, by the control unit 220 of each signal 1100, as in the periods T1 to T4.

In addition, this "period set in advance" may be each of the periods T1 to T4. For example, each of the signals 1100-1 and 1100-2 may compares the number of traveling vehicles in the lane A with the number of stopped vehicles in the lane B in the period T1 and change the display state of the signal display unit 230 on the basis of this comparison result.

In addition, each of the signals 1100-1 and 1100-2 compares the number of traveling vehicles in the lane A with the number of stopped vehicles in the lane B in each of the periods T2, T3, T4, . . . as in the case of the period T1. Then, each of the signals 1100-1 and 1100-2 may change the display state of the signal display unit 230 on the basis of the comparison result so that vehicles traveling in the lane with the high volume of traffic can move with priority over vehicles traveling in the lane with the low volume of traffic.

In addition, when the sum of the number of vehicles traveling in a plurality of lanes becomes equal to or larger than the number set in advance, the signals 1100-1 and 1100-2 may compare the volumes of traffic in the plurality of lanes.

In addition, although the number of vehicles traveling in the lane or the number of vehicles traveling for a unit time has been described herein, the volume of traffic is not limited to these. For example, the detection section 221 may detect the number of vehicles, which is the number of vehicles stopped before the crossroads CRS and is the number of vehicles stopped in each lane, as the volume of traffic. In this case, the display control section 222 may change the display state of the signal display unit 230 so as to reduce the number of stopped vehicles according to stopped vehicles.

<Case of a Plurality of Lanes>

In addition, although the case of two lanes which are one-way streets has been described in the above explanation using FIG. 11, the signal 1100 according to the present embodiment is not limited to such a case of two lanes which are one-way streets, and may cope with the arbitrary number of lanes which are not one-way streets.

Figure 15:
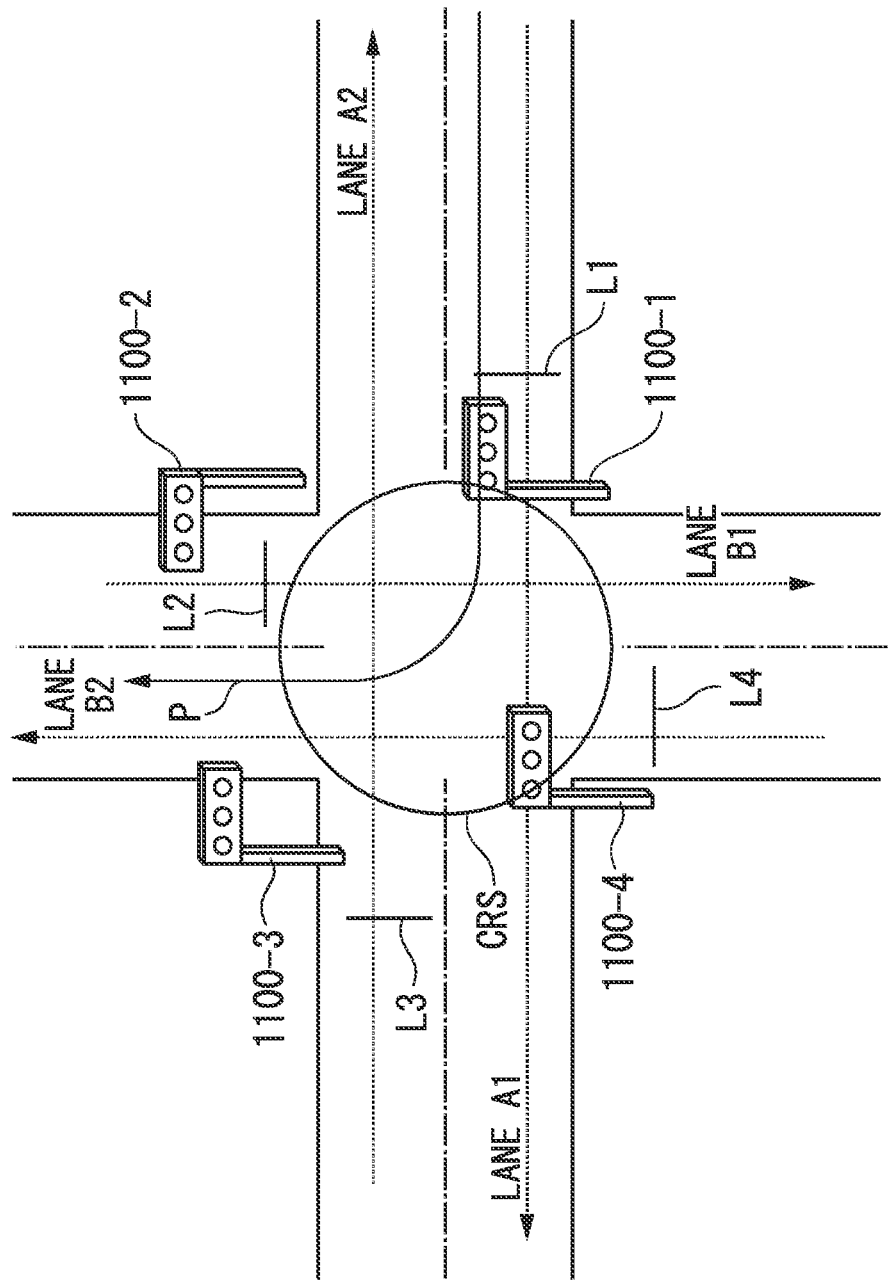
FIG. 15 is an explanatory view showing a crossroads (second example) as an example in the second embodiment of the present invention.

Here, an example of the arbitrary number of lanes which are not one-way streets will be described using FIG. 15. In FIG. 15, the same reference numerals are given to sections corresponding to each section in FIG. 9 or 11, and the explanation will be omitted.

In FIG. 15, lanes A1 and A2 which are opposite lanes and lanes B1 and B2 which are opposite lanes cross each other at the crossroads CRS. In addition, signals 1100-1 and 1100-3 and signals 1100-2 and 1100-4 are placed before the crossroads CRS in the lanes A1 and A2 and the lanes B1 and B2. The signals 1100-1, 1100-2, 1100-3, and 1100-4 have the same configuration as the signal 1100 described using FIG. 9, as in the case of FIG. 11.

Moreover, in FIG. 15, there is a stop line L1 before the signal 1100-1 and a stop line L3 before the signal 1100-3 at the crossroads CRS. In addition, there is a stop line L2 before the signal 1100-2 and a stop line L4 before the signal 1100-4 at the crossroads CRS. For this reason, a vehicle in each lane stops before the stop lines L1 to L4 according to the lighting of the third light emitting section of the signal display unit 230 of each of the signals 1100-1 to 1100-4.

Meanwhile, also in the case of FIG. 15, the signals 1100-1, 1100-2, 1100-3, and 1100-4 need to control the signal display unit 230 of each signal 1100 by the control unit 220 of the corresponding signal 1100 so that a vehicle traveling in the lane called the lane A1 or the lane A2 and a vehicle traveling in the lane called the lane B1 or the lane B2 do not collide with each other at the crossroads CRS, as in the case of FIG. 11.

For example, the control unit 220 of each signal 1100 needs to control the signal display unit 230 of the signal 1100 using the control unit 220 of the corresponding signal 1100 so that a vehicle traveling in the lane called the lane A1 or the lane A2 and a vehicle traveling in the lane called the lane B1 or the lane B2 do not move toward the crossroads CRS at the same timing.

Therefore, as an example, the control unit 220 of each of the signals 1100-1 and 1100-3 changes the display state of the signal display unit 230 to the same display state at the same timing. In addition, the control unit 220 of each of the signals 1100-2 and 1100-4 changes the display state of the signal display unit 230 to the same display state at the same timing. In addition, the control unit 220 provided in each signal 1100 changes the display state of each signal display unit 230 so that the display states of the signals 1100-1 and 1100-3 are different from the display states of the signals 1100-2 and 1100-4.

Moreover, as described above, it is not allowed that both the display states of the signals 1100-1 and 1100-3 and the display states of the signals 1100-2 and 1100-4 indicate "movable" at the same timing. This is because vehicles traveling in different lanes may collide with each other at the crossroads CRS if both the display states of the signals 1100-1 and 1100-3 and the display states of the signals 1100-2 and 1100-4 indicate "movable" at the same timing. In addition, both the display states of the signals 1100-1 and 1100-3 and the display states of the signals 1100-2 and 1100-4 may indicate "not movable".

Therefore, the control unit 220 provided in each signal 1100 changes the display state of each signal display unit 230 such that the display states of the signals 1100-1 and 1100-3 are different from the display states of the signals 1100-2 and 1100-4 and the display states of the signals 1100-1 and 1100-3 and the display states of the signals 1100-2 and 1100-4 do not indicate "movable" at the same timing.

Accordingly, also in this case, the control unit 220 of each of the signals 1100-1 and 1100-3 changes the display state of the signal display unit 230 as in the case of the lane A described using FIG. 12 and the control unit 220 of each of the signals 1100-2 and 1100-4 changes the display state of the signal display unit 230 as in the case of the lane B described using FIG. 12. Therefore, also in the case of FIG. 15, the signals 1100-1 to 1100-4 can appropriately perform control to change the display state of the signal display unit even when the signals 1100-1 to 1100-4 cannot communicate with the high-order control apparatus and even when the signals 1100-1 to 1100-4 cannot receive a control signal from the high-order control apparatus, as in the case of FIG. 12.

In addition, as indicated by the reference numeral P in FIG. 15, there may be a vehicle which turns right at the crossroads CRS from the lane A1 to travel in the lane B2. That is, a vehicle which turns right at the crossroads CRS may also be present.

Therefore, the display control section 222 changes the display state of the signal display unit 230 so that priority is given to right turn (right turn signal). Then, for example, it is possible to reduce an increase in the number of vehicles which cannot turn right since vehicles traveling in the lane A1 cannot turn right at the crossroads CRS and stop near the stop line L1. Accordingly, the display control section 222 can reduce (alleviate) the traffic congestion caused by turning right at the crossroads CRS.

In addition, the display control section 222 changes the display state of the signal display unit 230 so that a right turn signal time is adjusted. As a result, a vehicle easily turns right at the crossroads CRS. In addition, it is possible to reduce an increase in the number of vehicles which cannot turn right since vehicles cannot turn right at the crossroads CRS and stop near the stop line L1. Accordingly, the display control section 222 can reduce the traffic congestion caused by turning right at the crossroads CRS.

In addition, when the display control section 222 changes the display state of the signal display unit 230 as described above so that priority is given to right turn or the right turn signal time is adjusted, the detection section 221 detects a vehicle turning right on the basis of a captured image.

For example, the detection section 221 detects a vehicle, which is stopped within the crossroads CRS or before the crossroads CRS and which is located at the right end of the lane, as a vehicle turning right on the basis of a captured image. In addition, it is assumed that a direction indictor, which indicates a direction when a vehicle changes course by blinking and which is provided in a vehicle, is imaged by the imaging unit 210. In this case, the detection section 221 may detect a vehicle turning right by determining whether or not a vehicle turns right on the basis of an image of the direction indictor provided in the vehicle, the image being captured by the imaging unit 210. In addition, the detection section 221 may detect a vehicle turning right by arbitrarily combining such a method of detecting a vehicle turning right.

In addition, as described above, when a vehicle turning right is detected by the detection section 221, the display control section 222 changes the display state of the signal display unit 230 so that priority is given to right turn or the right turn signal time is adjusted.

In addition, the "display control section 222 changes the display state of the signal display unit 230 so that priority is given to right turn (right turn signal)" is that the display control section 222 changes the display state of the signal display unit 230 so that a vehicle turning right can move with priority over a vehicle which does not turn right or over the case where there is no vehicle turning right at the crossroads CRS. The "vehicle which does not turn right" referred to herein is a vehicle going straight in the lane without changing the course or a vehicle turning left, for example.

As an example, it is assumed that the signal display unit 230 includes a light emitting section corresponding to right turn. In this case, the display control section 222 changes the display state of the signal display unit 230 so that priority is given to a vehicle turning right by controlling the display state of the light emitting section corresponding to right turn.

In addition, the "display control section 222 changes the display state of the signal display unit 230 so that the right turn signal time is adjusted" is that, for example, the display control section 222 adjusts a time for changing the display state of the signal display unit 230, so that the period of time for the vehicle turning right becomes longer compared to a case there are no vehicle turning right or the vehicle do not turn right at the crossroads CRS.

As an example, it is assumed that the signal display unit 230 includes a light emitting section corresponding to right turn. In this case, the "display control section 222 changes the display state of the signal display unit 230 so that the right turn signal time is adjusted" is that, for example, the display control section 222 changes the display state of the signal display unit 230 by controlling the display state of a light emitting section corresponding to right turn, so that a period of time for the vehicle turning right becomes longer compared to a case there are no vehicle turning right or the vehicle do not turn right at the crossroads CRS.

<Emergency Vehicle Priority>

In addition, the detection section 221 may detect the type of a vehicle on the basis of a captured image. For example, an emergency vehicle has a red light. Therefore, the detection section 221 may determine whether or not a vehicle has a red light on the basis of a captured image and detect the type of the vehicle as an emergency vehicle when the vehicle has a red light. This emergency vehicle is an automobile for firefighting, an automobile for emergencies, or a police car, for example.

In addition, the emergency vehicle may have a predetermined color, such as red or white. Therefore, the detection section 221 may determine whether or not the vehicle type is an emergency vehicle by combining the color of a vehicle with the criteria for determining whether or not the vehicle has a red light. For example, the detection section 221 determines whether the color of a vehicle is red or white on the basis of a captured image. In addition, when the color of a vehicle is red or white and the vehicle has a red light, the detection section 221 may detect the type of the vehicle as an emergency vehicle.

Moreover, in the second mode, when the detected type of the vehicle is an emergency vehicle, the display control section 222 may change the display state of the signal display unit 230 so that the emergency vehicle can move with priority over vehicles whose vehicle types are not emergency vehicles. As a result, the emergency vehicle can move in the lane with priority over vehicles whose vehicle types are not emergency vehicles. Thus, it is preferable in a disaster or the like that an emergency vehicle can travel in the lane preferentially.

In addition, when detecting the type of a vehicle on the basis of a captured image, the detection section 221 may detect the type of a vehicle on the basis of a captured image and a sound picked up by the sound pickup unit 250. For example, when the type of a vehicle is an emergency vehicle, this vehicle may sound the siren. Therefore, the detection section 221 may determine whether or not a siren sound is included in the sound picked up by the sound pickup unit 250 and determine whether or not the type of a vehicle is an emergency vehicle by combining this determination result and a determination ermined result based on the captured image described above.

In addition, when the sound pickup unit 250 is a sound pickup device which picks up the sound so that the direction of a sound source can be specified, the detection section 221 can detect the direction of an emergency vehicle including a sound source which sounds the siren. In this case, the detection section 221 can detect an emergency vehicle more accurately on the basis of the detected direction of the emergency vehicle and the direction of the emergency vehicle detected on the basis of the image.

Since it is possible to detect an emergency vehicle more accurately as described above, the display control section 222 can change the display state of the signal display unit 230 more accurately so that the emergency vehicle can move preferentially in the second mode. In addition, since the direction of an emergency vehicle can be seen more accurately through the detection section 221, the display control section 222 can also estimate the lane, in which the emergency vehicle travels from now, more accurately. Accordingly, in the second mode, the display control section 222 can change the display state of the signal display unit 230 so that the emergency vehicle can move preferentially. In this manner, the emergency vehicle can travel in the lane preferentially. Thus, it is preferable in a disaster or the like that an emergency vehicle can travel in the lane preferentially.

<Measures Against Afternoon Sun or Morning Sun>

In the signal display unit 230 that is described above by using FIG. 9, each light emitting section corresponding to one signal may include a plurality of light emitting elements. This light emitting section corresponding to one signal is the first light emitting section 231, the second light emitting section 232, or the third light emitting section 233 described above. In addition, as an example, the plurality of light emitting elements is a plurality of LEDs (Light Emitting Diodes). That is, an emission method of the signal display unit 230 of the signal 1100 described above may be a method using an LED.

Moreover, in this case, when making the light emitting section of the signal display unit 230 light, the display control section 222 of the control unit 220 makes some of the plurality of light emitting elements provided in the light emitting section emit light or extinguished while making the plurality of light emitting elements emit light such that the position of the place of emission or extinguishing in the light emitting section changes. That is, the display control section 222 of the control unit 220 makes the plurality of light emitting elements emit light by moving only some lighting regions (or extinguished regions) instead of lighting all regions of respective colors of a signal which can light.

For example, when the afternoon sun, the morning sun, or the like shines into the signal 1100, it becomes difficult for a user who observes the signal 1100 to see which of the plurality of light emitting sections provided in the signal display unit 230 emits light. On the other hand, when the display control section 222 of the control unit 220 makes the light emitting section of the signal display unit 230 lights as described above, the emission place of the light emitting section that lights moves instead of simply lighting. Therefore, even if the afternoon sun, the morning sun, or the like shines into the signal 1100, it becomes easy for a user who observes the signal 1100 to see which of the plurality of light emitting sections provided in the signal display unit 230 emits light.

Moreover, when making the light emitting section of the signal display unit 230 light, the display control section 222 of the control unit 220 makes some of the plurality of light emitting elements provided in the light emitting section emit light or extinguished while making the plurality of light emitting elements emit light such that the place of emission or extinguishing rotates, moves, enlarges, or is reduced in the light emitting section. In this case, it becomes easier for a user who observes the signal 1100 to see which of the plurality of light emitting sections provided in the signal display unit 230 emits light even if the afternoon sun, the morning sun, or the like shines into the signal 1100.

In addition, when making the light emitting section of the signal display unit 230 light, the display control section 222 of the control unit 220 makes the light emitting section emit light such that the brightness of an extinguished light emitting element, which is a light emitting element provided in the light emitting section that lights, changes. For example, when making the light emitting section of the signal display unit 230 light, the display control section 222 of the control unit 220 may make some light emitting elements emit light or extinguished as described above while changing the brightness of the extinguished light emitting element sequentially from the low brightness to the high brightness instead of simply maintaining the extinguished state. In addition, the display control section 222 of the control unit 220 may repeat this brightness change by changing the brightness of the light emitting element sequentially from the low brightness to the high brightness and then changing the brightness of the light emitting element sequentially from the high brightness to the low brightness.

As a result, it becomes easier for a user who observes the signal 1100 to see which of the plurality of light emitting sections provided in the signal display unit 230 emits light even if the afternoon sun, the morning sun, or the like shines into the signal 1100.

In addition, although the respective signals 1100 operate independently of each other in the above explanation, the respective signals 1100 may communicate with each other. For example, the respective signals 1100 may communicate with each other through the communication network 1300 described using FIG. 9. In addition, communication through the communication network 1300 may be impossible in a disaster. Therefore, the signals 1100 may also communicate with each other through a communication network different from the communication network 1300. The communication network in this case may be a radio communication network.

In addition, in the case of FIG. 11, it is preferable that at least the signals 1100-1 and 1100-2 related to the crossroads CRS can communicate with each other through such a communication network. In addition, in the case of FIG. 15, it is preferable that at least the signals 1100-1 to 1100-4 related to the crossroads CRS can communicate with each other.

Moreover, also in this case, each signal 1100 changes the display state of each signal display unit 230 so that vehicles traveling in different lanes do not collide with each other at the crossroads CRS, as described using FIG. 11 or 15. For example, the control unit 220 provided in each signal 1100 changes the display state of each signal display unit 230 so that the display states of the signals 1100 corresponding to the lanes, which are not opposite lanes, are different and the display states do not indicate "movable" at the same timing.

Thus, as long as the signals 1100 related to the crossroads can communicate with each other, the information called the volume of traffic detected may be transmitted or received therebetween. In this case, in each signal 1100, the imaging unit 210 may be fixed to the signal 1100 so as to image at least the lane in which traffic is controlled by the display state of the signal display unit 230. That is, the signal 1100 detects the volume of traffic only in the lane in which traffic is controlled by the signal 1100. Then, the detected volume of traffic is transmitted to another signal 1100. In this way, all of the signals 1100 related to the crossroads may detect the volume of traffic of all the lanes related to the crossroads.

Also in this case, each signal 1100 can detect the volume of traffic in each lane on the basis of an image captured by the imaging unit 210 of each signal. Therefore, as described using FIG. 11 or 15, the signal 1100 can appropriately perform control to change the display state of the signal display unit even when the signal 1100 cannot communicate with the high-order control apparatus and even when the signal 1100 cannot receive a control signal from the high-order control apparatus.

In addition, although the case where the signals 1100 related to the crossroads communicate with each other has been described herein, the present invention is not limited to this. For example, the signals 1100 placed in a line one by one in the same lane may communicate with each other. Accordingly, each of the signals 1100 placed in a line one by one may control its own signal display unit 230 so that vehicles, which travel in the same lane and pass through the signals 1100 placed in a line one by one, can move without making the vehicle "not movable" by any of the signals 1100.

In addition, when the signals 1100 placed in a line one by one communicate with each other, a radio communication unit provided in each signal 1100 may perform relay transmission. Thus, not only the signals 1100 placed adjacent to each other can communicate with each other, but also the signals 1100 located far from each other can communicate with each other.

Figure 10:
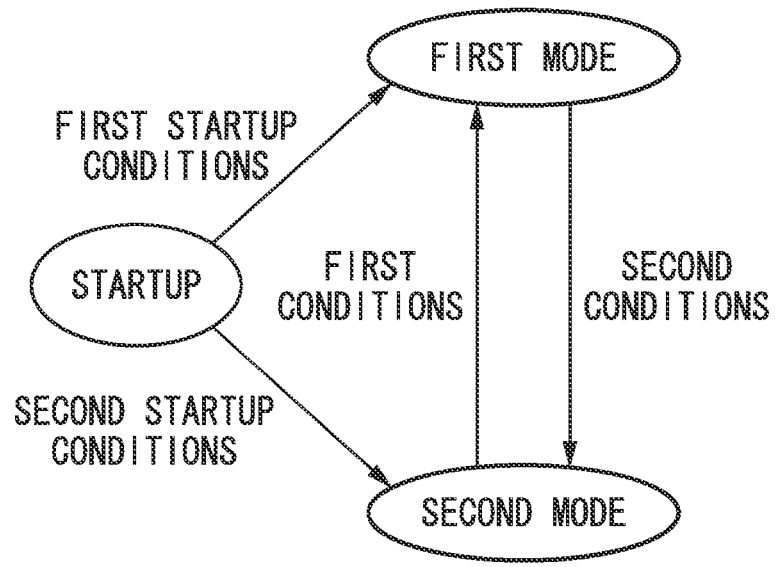
FIG. 10 is a state transition diagram illustrating the transition between modes of a signal according to the second embodiment of the present invention.

In addition, in the explanation of FIG. 10, the power switching section 243 changed the state between the first and second modes on the basis of a voltage or current of electric power supplied to the power supply section 241. However, the power switching section 243 may change the state between the first and second modes on the basis of a control signal for mode change without being limited to this. This control signal for mode change may be received through radio communication, for example. In addition, this control signal for mode change may be broadcast in a disaster or the like. Therefore, each signal 1100 can change the mode reliably without depending on a voltage or current of electric power supplied to the power supply section 241 in a disaster.

In addition, the signal 1100 may be a temporary signal for construction. In this case, the signal 1100 may operate by supply of electric power only from the battery section 242. Also in this case, the signal 1100 changes the display state of the signal display unit 230 fixed to the signal 1100 on the basis of an image captured by the imaging unit 210. Therefore, just by installing in the lane the signal 1100 which is such a temporary signal for construction, the user can appropriately perform control to change the display state of the signal display unit 230 even when there is no communication between the high-order control apparatus 1200 and the signal 1100 and it is not possible to receive a control signal from the high-order control apparatus 1200. Accordingly, the signal 1100 can control traffic appropriately. For this reason, such a signal 1100 is suitable for construction.

In addition, when the signal 1100 is a temporary signal for construction, the power supply unit 240 of the signal 1100 may supply electric power only from the battery section 242 to each component provided in the signal 1100. In this case, in the mode described using FIG. 10, the power switching section 243 may change the state to the second mode after electric power is supplied and may also continue changing the state to the second mode thereafter.

For example, when the signal 1100 is a temporary signal for construction, electric power may not be supplied from the outside. As described above, since the power supply unit 240 of the signal 1100 supplies electric power only from the battery section 242 to each component provided in the signal 1100, the display control section 222 can change the display state of the signal display unit 230 even if thus electric power is not supplied from the outside.

Moreover, as described using FIGS. 9 and 10, in the first mode, the display control section 222 changes the display state of the signal display unit 230 through the I/F 271 on the basis of a control signal received from the high-order control apparatus 1200 by the communication section 223. However, the method used when the display control section 222 changes the display state of the signal display unit 230 in the first mode is not limited to this.

For example, in the first mode, the display control section 222 may change the display state of the signal display unit 230 on the basis of the volume of traffic detected by the detection section 221. That is, also in the first mode, the display control section 222 may change the display state of the signal display unit 230 on the basis of the volume of traffic detected by the detection section 221, in the same manner as in the case of the second mode.

In addition, in the first mode, the display control section 222 may change the display state of the signal display unit 230 on the basis of a predetermined timing set in advance.

In addition, although the case where vehicles pass through the left side of the lane has been described above, the signal 1100 according to the present embodiment may also be applied to the case where vehicles pass through the right side of the lane in the same manner as in the case where vehicles pass through the left side of the lane. In the case of right-hand traffic, right turn in the case of left-hand traffic described above is left turn. The right turn in the case of left-hand traffic or left turn in the case of right-hand traffic described above is that a vehicle changes course so as to cross the opposite lane to the lane in which the vehicle has traveled until now.

In this case, the "display control section 222 changes the display state of the signal display unit 230 so that priority is given to right turn" described above means that "when a vehicle changes course so as to cross the opposite lane to the lane in which the vehicle has traveled until now, the control unit 220 (or the display control section 222) changes the display state of the signal display unit 230 on the basis of an image captured by the imaging unit 210 so that priority is given to the vehicle which changes course.

In addition, the "display control section 222 changes the display state of the signal display unit 230 so that the right turn signal time is adjusted" described above means that "when a vehicle changes course so as to cross the opposite lane to the lane in which the vehicle has traveled until now, the control unit 220 (or the display control section 222) changes the display state of the signal display unit 230, so that the period of "movable" time for the vehicle which changes course is adjusted in a case when a vehicle changes course so as to cross the opposite lane to the lane in which the vehicle has traveled until now on the basis of an image captured by the imaging unit 210.

In this way, when a vehicle changes course so as to cross the opposite lane to the lane in which the vehicle has traveled until now, the signal 1100 according to the present embodiment can make the vehicle easily change the course so as to cross the opposite lane to the lane in which the vehicle has traveled until now in both the cases of left-hand traffic and right-hand traffic. As a result, in both the cases of left-hand traffic and right-hand traffic, the signal 1100 according to the present embodiment can reduce (alleviate) traffic congestion caused when vehicles change course so as to cross the opposite lane to the lane in which the vehicles have traveled until now.

In addition, when the signal 1100 according to the present embodiment corresponds to both left-hand traffic and right-hand traffic, it is possible to set to which of the left-hand traffic and the right-hand traffic the signal 1100 corresponds, through a setting unit provided in the signal 1100, when electric power is supplied to the signal 1100 or when the signal 1100 is shipped. In addition, the control unit 220 may determine to which of the left-hand traffic and the right-hand traffic the signal 1100 corresponds on the basis of the setting.

In addition, the signal 1100 may determine whether the lane in which traffic is controlled by the signal 1100 is left-hand traffic or right-hand traffic on the basis of an image captured by the imaging unit 210. In addition, on the basis of this determination result, the signal 1100 may set to which of left-hand traffic and right-hand traffic the signal 1100 corresponds, through its own setting unit.

In addition, although only a signal for a vehicle has been described as the signal 1100 in the above, the signal 1100 may also be a signal when a person crosses the road (otherwise, roadway) or a signal for a train on the railroad without being limited to only the vehicle.

In addition, each component provided in the signal control apparatus 1100 in FIG. 9, such as the detection section 221, the display control section 222, the communication section 223, and the power switching section 243, may be realized by dedicated hardware. In addition, each component may be configured by a memory and a CPU (central processing unit) and the function may be realized by loading a program for realizing the function of each component into the memory and executing it.

In addition, processing by each component may be executed by recording a program for realizing the embodiment of the present invention in a computer-readable recording medium, reading the program recorded in the recording medium into a computer system, and executing the read program. In addition, the "computer system" referred to herein may include hardware, such as an OS (Operating System) or a surrounding device.

In addition, the "computer system" may also include a homepage presenting environment (or display environment) if a WWW system is used. In addition, the "computer-readable recording medium" refers to writable nonvolatile memories such as a flexible disk, a magneto-optical disc, a ROM, and a flash memory, portable media such as a CD-ROM, and a recording device such as a hard disk built in a computer system. In addition, the 'computer-readable recording medium' may include a recording medium that stores a program dynamically for a short period of time like a network, such as the Internet, or a communication line when a program is transmitted through a communication line such as a telephone line, and include a recording medium that stores a program for a predetermined period of time like a volatile memory (for example, a DRAM (Dynamic Random Access Memory)) in a computer system serving as a server or a client in this case. In addition, the program may be transmitted from a computer system, which has a storage device or the like that stores the program, to another computer system through a transmission medium or a transmission wave in the transmission medium. Here, the 'transmission medium' that transmits a program refers to a medium with a function of transmitting information like a network (communication network), such as the Internet, or a communication line, such as a telephone line. In addition, the above program may be a program for realizing some of the functions described above or may be a so-called difference file (difference program) capable of realizing the above functions by combination with a program already recorded in the computer system.

While the embodiments of the present invention have been described in detail with reference to the drawings, the specific configuration is not limited to the above-described embodiments, and design and the like which do not depart from the spirit of the present invention are also included.

The television camera apparatus for traffic monitoring disclosed in Japanese Unexamined Patent Application Publication No. 11-261990 displays a photographed image on a monitor, and a person needs to view and confirm the photographed image in order to acquire the information regarding a vehicle within the photographed image, for example. When a person extracts the information regarding a vehicle and the like within the photographed image on the basis of an image photographed in a traffic signal, there has been a problem in that a large amount of time and effort are required.

Moreover, in the traffic signal disclosed in Japanese Unexamined Patent Application Publication No. 10-97696, there is a problem in that the display state of the signal display unit cannot be appropriately changed when a control signal cannot be received from the high-order control apparatus at the time of disaster, for example.

The aspect related to the present invention has been made in view of the above point, and it is an object of the aspect related to the present invention to provide an information control apparatus capable of acquiring the information regarding a vehicle and the like within an image photographed near a traffic signal, data analyzing apparatus, signal, server, information control system, and program.

It is another object of the aspect related to the present invention to provide signal control apparatus, traffic signal, and program that are capable of appropriately changing a display state of a signal display unit even if a control signal for changing the display state of the signal display unit cannot be received.

An aspect of the present invention has been made to solve the above-described problems and is characterized in that a determination unit which determines at least an attribute of objects to be analyzed based on the captured image data acquired by an imaging apparatus fixed to a signal, and an output unit which outputs the determination result information of the determination unit to a data analyzing unit that generates an analyzing result information which is at least based on the attributes of the object to be analyzed, are provided.

In addition, another aspect of the present invention is characterized in that a control unit which changes a display state of a signal display unit fixed to a signal based on an image captured by an imaging unit, and a battery unit which supplies electric power to each component of the own apparatus, are provided.

According to an aspect of the present invention, it is possible to acquire the information regarding a vehicle and the like within an image photographed near a signal.

In addition, according to another aspect of the present invention, it is possible to appropriately change a display state of a signal display unit even if a control signal for changing the display state of the signal display unit cannot be received.

What is claimed is:

1. A vehicle comprising a mobile communication device, wherein the mobile communication device is connected to
    a driving unit of the vehicle and controls a traveling speed of the vehicle, which is traveling toward an intersection, in order to avoid a collision of the vehicle at the intersection by receiving analysis result information, which is calculated by analyzing image information from an imaging apparatus provided on a traffic signal that is disposed near the intersection, from an information control apparatus,
    wherein the information control apparatus is configured to (i) detect the vehicle traveling in a first lane that enters the intersection and at least one other vehicle traveling in a second lane that enters the intersection in a direction different from the first lane, (ii) calculate the traveling speed of the vehicle and a traveling speed of the at least one other vehicle, and (iii) determine whether or not timing at which the vehicle and the at least one other vehicle enter the intersection is same when the vehicle and the at least one other vehicle enter the intersection at the calculated traveling speeds and calculate a possibility of the collision between the vehicle and the at least one other vehicle at the intersection, by analyzing the image information from the imaging apparatus,
    wherein, when it is determined that the timing at which the vehicle and the at least one other vehicle enter the intersection is the same, the information control apparatus determines that the possibility of the collision between the vehicle and the at least one other vehicle is higher than a predetermined possibility and transmits the analysis result information to the mobile communication device,
    wherein the analysis result information includes an incidence rate of sudden braking of vehicles at the intersection that is calculated by statistical processing and analysis of image data acquired by the imaging apparatus, and
    wherein the mobile communication device controls the driving unit of the vehicle so as to reduce the traveling speed of the vehicle in a case the mobile communication device receives the analysis result information, which includes the determination that the possibility of the collision is higher than the predetermined possibility, from the information control apparatus, and which includes the incidence rate of sudden braking of vehicles at the intersection.

2. The vehicle according to claim 1,
    wherein the mobile communication device controls a traveling direction of the vehicle in order to avoid the collision of the vehicle at the intersection.

3. The vehicle according to claim 1,
    wherein the analysis result information is based on a motion vector and the traveling speed of the vehicle calculated by analyzing image information from the imaging apparatus provided near the intersection, from the information control apparatus, and
    wherein the traveling speed is calculated based on calculation of traveling speed of each image region of a plurality of image regions that are detected based on the motion vector and that correspond to the vehicle.

4. The vehicle according to claim 1,
    wherein the mobile communication device is configured to be communicably connected to the information control apparatus through a network, and
    wherein the information control apparatus is configured to be communicably connected to an information control server through the network.

5. An information control system comprising:
    an imaging apparatus that captures images and is provided on a traffic signal that is disposed near an intersection; and
    an information control apparatus that analyzes traveling states of vehicles that enter the intersection from different directions to each other and that transmits information, which is for avoiding a collision between the vehicles at the intersection, to mobile communication devices mounted on the vehicles to control traveling speeds of the vehicles, calculated by analyzing image information from the imaging apparatus,
    wherein the information control apparatus is configured to (i) detect a vehicle traveling a first lane that enters the intersection and at least one other vehicle traveling a second lane that enters the intersection in a direction different from the first lane, (ii) calculate the traveling speed of the vehicle and a traveling speed of the at least one other vehicle, and (iii) determine whether or not timing at which the vehicle and the at least one other vehicle enter the intersection is same when the vehicle and the at least one other vehicle enter the intersection at the calculated traveling speeds and calculate a possibility of the collision between the vehicles at the intersection, by analyzing the image information from the imaging apparatus, wherein, when it is determined that the timing at which the vehicle and the at least one other vehicle enter the intersection is the same, the information control apparatus determines that the possibility of the collision between the vehicle and the at least one other vehicle is higher than a predetermined possibility and transmits the analysis result information to the mobile communication devices, wherein the analysis result information includes an incidence rate of sudden braking of vehicles at the intersection that is calculated by statistical processing and analysis of image data acquired by the imaging apparatus, and wherein the mobile communication devices control the vehicles so as to reduce the traveling speed of the vehicles in a case the mobile communication devices receive the analysis result information, which includes the determination that the possibility of the collision is higher than the predetermined possibility, from the information control apparatus, and which includes the incidence rate of sudden braking of vehicles at the intersection.

6. The information control system according to claim 5, wherein the information for avoiding the collision is based on motion vectors and the traveling speeds of the vehicles calculated by analyzing image information from the imaging apparatus, and wherein the traveling speeds are calculated based on calculation of traveling speeds of each image region of a plurality of image regions that are detected based on the motion vectors and that correspond to the vehicles.

7. The information control system according to claim 5, wherein the information control apparatus is configured to be communicably connected to the mobile communication devices through a network, and wherein the information control apparatus is configured to be communicably connected to an information control server through the network.

8. A vehicle comprising a mobile communication device, wherein the mobile communication device is connected to a driving unit of the vehicle and controls a traveling speed of the vehicle, which is traveling toward an intersection, in order to avoid a collision of the vehicle at the intersection by receiving analysis result information, which is calculated by analyzing image information from an imaging apparatus provided near the intersection, from an information control apparatus, wherein the imaging apparatus is provided on a traffic signal which is disposed near the intersection, wherein the traffic signal includes a signal display unit and a pole part that supports the signal display unit at an upper part of the pole part, wherein the signal display unit includes light emitting sections in order to control a flow of traffic with the light emitting sections, wherein the imaging apparatus is fixed to the signal display unit, wherein the information control apparatus is configured to (i) detect the vehicle traveling in a first lane that enters the intersection and at least one other vehicle traveling in a second lane that enters the intersection in a direction different from the first lane, (ii) calculate the traveling speed of the vehicle and a traveling speed of the at least one other vehicle, and (iii) determine whether or not timing at which the vehicle and the at least one other vehicle enter the intersection is same when the vehicle and the at least one other vehicle enter the intersection at the calculated traveling speeds and calculate a possibility of the collision between the vehicle and the at least one other vehicle at the intersection, by analyzing the image information from the imaging apparatus, wherein, when it is determined that the timing at which the vehicle and the at least one other vehicle enter the intersection is the same, the information control apparatus determines that the possibility of the collision between the vehicle and the at least one other vehicle is higher than a predetermined possibility and transmits the analysis result information to the mobile communication device, wherein the analysis result information includes an incidence rate of sudden braking of vehicles at the intersection that is calculated by statistical processing and analysis of image data acquired by the imaging apparatus, and wherein the mobile communication device controls the driving unit of the vehicle so as to reduce the traveling speed of the vehicle in a case the mobile communication device receives the analysis result information, which includes the determination that the possibility of the collision is higher than the predetermined possibility, from the information control apparatus, and which includes the incidence rate of sudden braking of vehicles at the intersection.

9. The vehicle according to claim 8, wherein the mobile communication device is configured to be communicably connected to the information control apparatus through a network, and wherein the information control apparatus is configured to be communicably connected to an information control server through the network.

* * * * *